(12) United States Patent
Choi et al.

(10) Patent No.: US 12,018,664 B2
(45) Date of Patent: Jun. 25, 2024

(54) COMPRESSOR

(71) Applicant: LG ELECTRONICS INC., Seoul (KR)

(72) Inventors: Kichul Choi, Seoul (KR); Youngpil Kim, Seoul (KR); Kiwon Noh, Seoul (KR); Eonpyo Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 148 days.

(21) Appl. No.: 17/793,263

(22) PCT Filed: Mar. 31, 2020

(86) PCT No.: PCT/KR2020/004388
§ 371 (c)(1),
(2) Date: Jul. 15, 2022

(87) PCT Pub. No.: WO2021/145509
PCT Pub. Date: Jul. 22, 2021

(65) Prior Publication Data
US 2023/0145653 A1    May 11, 2023

(30) Foreign Application Priority Data

Jan. 16, 2020 (KR) .......................... 10-2020-0006189

(51) Int. Cl.
*F04B 39/00* (2006.01)
*F04B 35/04* (2006.01)
(Continued)

(52) U.S. Cl.
CPC ........ *F04B 39/0044* (2013.01); *F04B 35/045* (2013.01); *F04B 39/0016* (2013.01);
(Continued)

(58) Field of Classification Search
CPC .............. F04B 39/0016; F04B 39/0044; F04B 39/045; F16F 15/073; F16J 1/09
See application file for complete search history.

(56) References Cited

U.S. PATENT DOCUMENTS

2006/0250032 A1* 11/2006 Her ....................... F04B 35/045
                                                      310/13
2008/0075610 A1   3/2008 Bonniface et al.

FOREIGN PATENT DOCUMENTS

CN       108425827 A  *  8/2018  ............. F04B 35/04
KR       19990002719      1/1999
(Continued)

OTHER PUBLICATIONS

Chen et al., 'New Compressor Unit and Linear Compressor Lubricating Oil'—(17793263_2024-02-_05_CN_10845827_A_M.pdf),Aug. 2018 (Year: 2018).*

(Continued)

*Primary Examiner* — Kenneth J Hansen
(74) *Attorney, Agent, or Firm* — Fish & Richardson P.C.

(57) ABSTRACT

A compressor includes a cylinder configured to form a compressed space of the refrigerant and having a cylindrical shape, a piston configured to reciprocate axially in the cylinder and comprising a guide portion having a cylindrical shape and a head portion disposed in front of the guide portion, an intake valve disposed at a front of the head portion, a fixing member disposed outside the piston, a rod comprising one end disposed at the head portion and configured to extend axially, a first elastic member connected to the fixing member and other side of the rod, a second elastic member disposed to be spaced apart from a rear of the first elastic member and connected to the fixing member and the other side of the rod, and a first spacer insert-injected with the first elastic member and the second elastic member.

20 Claims, 13 Drawing Sheets

(51) Int. Cl.
*F16F 15/073* (2006.01)
*F16J 1/09* (2006.01)

(52) U.S. Cl.
CPC ............... *F16F 15/073* (2013.01); *F16J 1/09* (2013.01); *F05B 2210/14* (2013.01); *F05B 2260/964* (2013.01)

(56) References Cited

FOREIGN PATENT DOCUMENTS

| KR | 20030042815 | 6/2003 |
| KR | 20070098879 | 10/2007 |
| KR | 20160011010 | 1/2016 |

OTHER PUBLICATIONS

International Search Report in International Application No. PCT/KR2020/004388, dated Oct. 15, 2020, 4 pages (with English translation).

* cited by examiner

[FIG. 1]
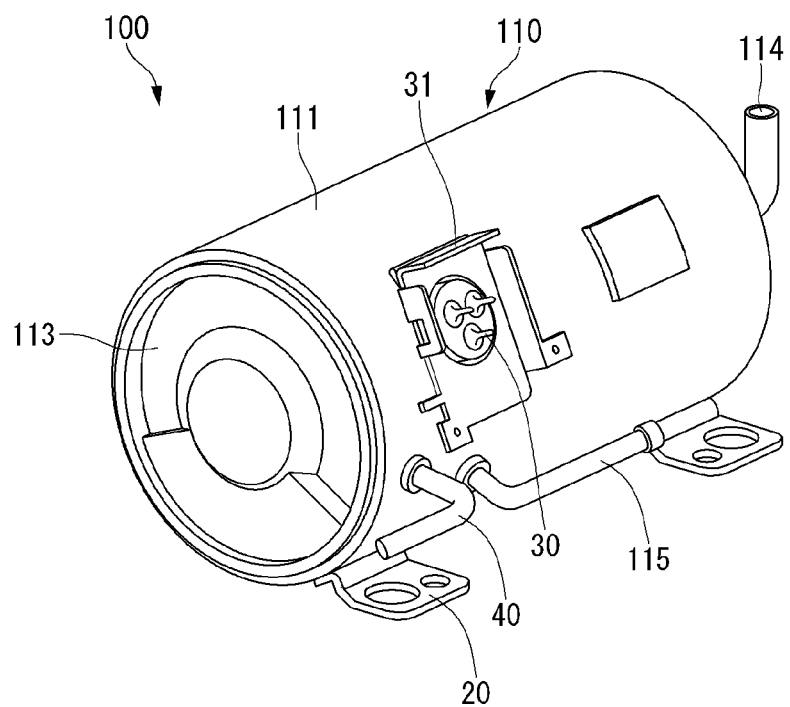

[FIG. 2]
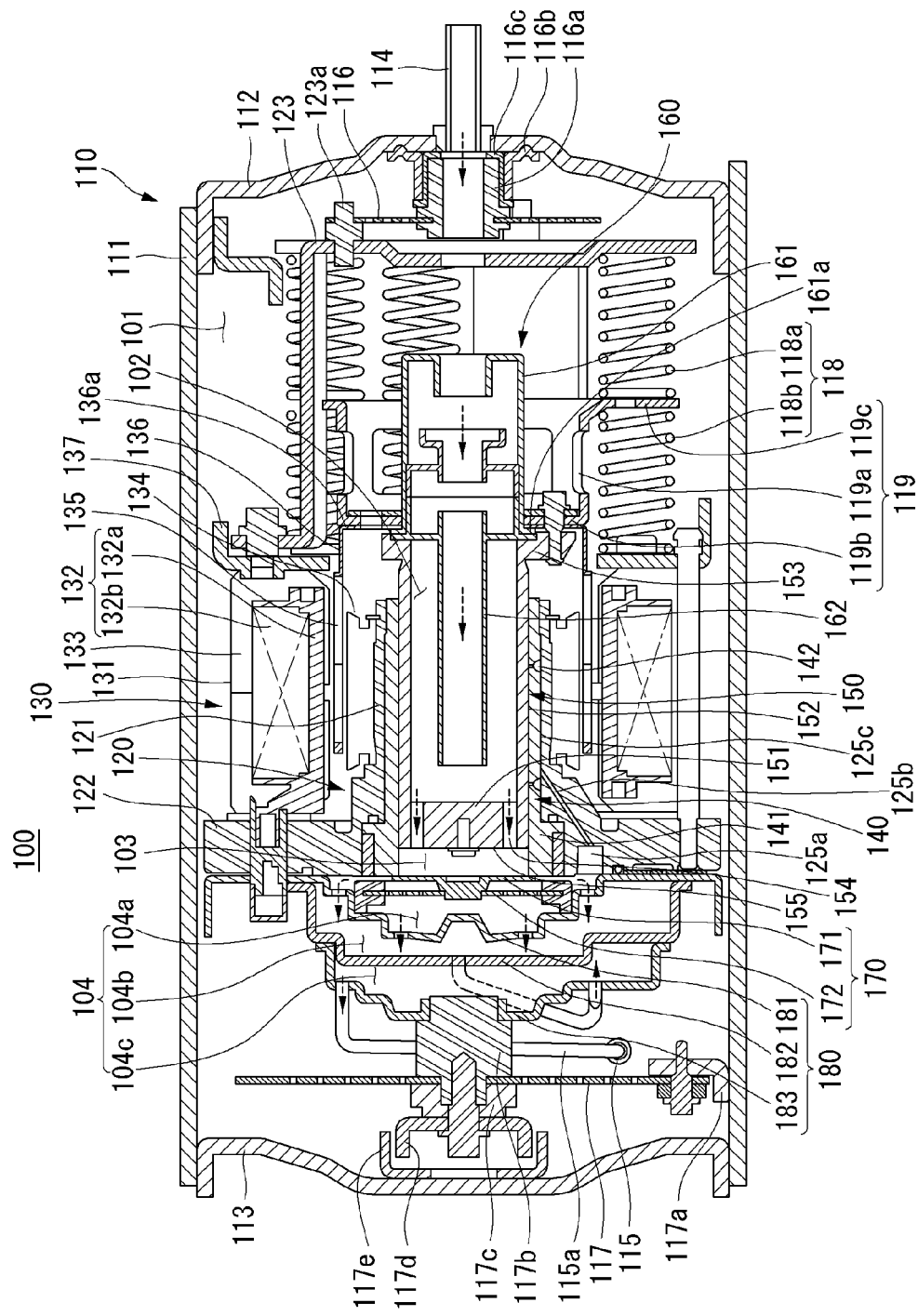

[FIG. 3]
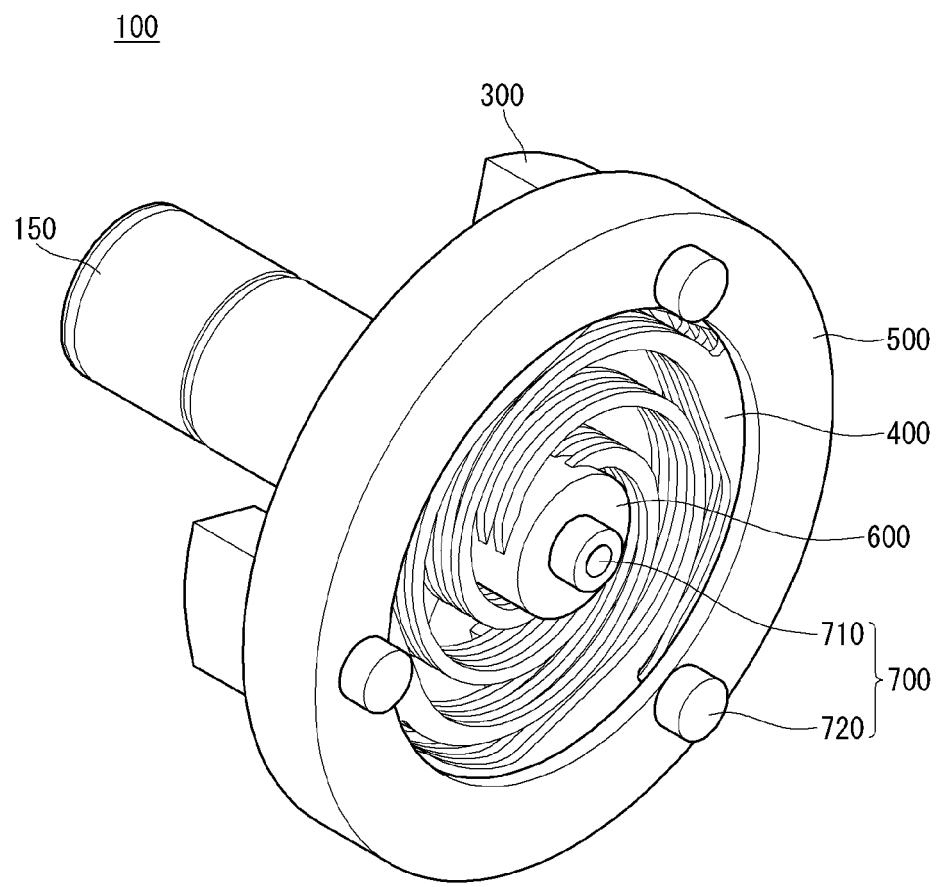

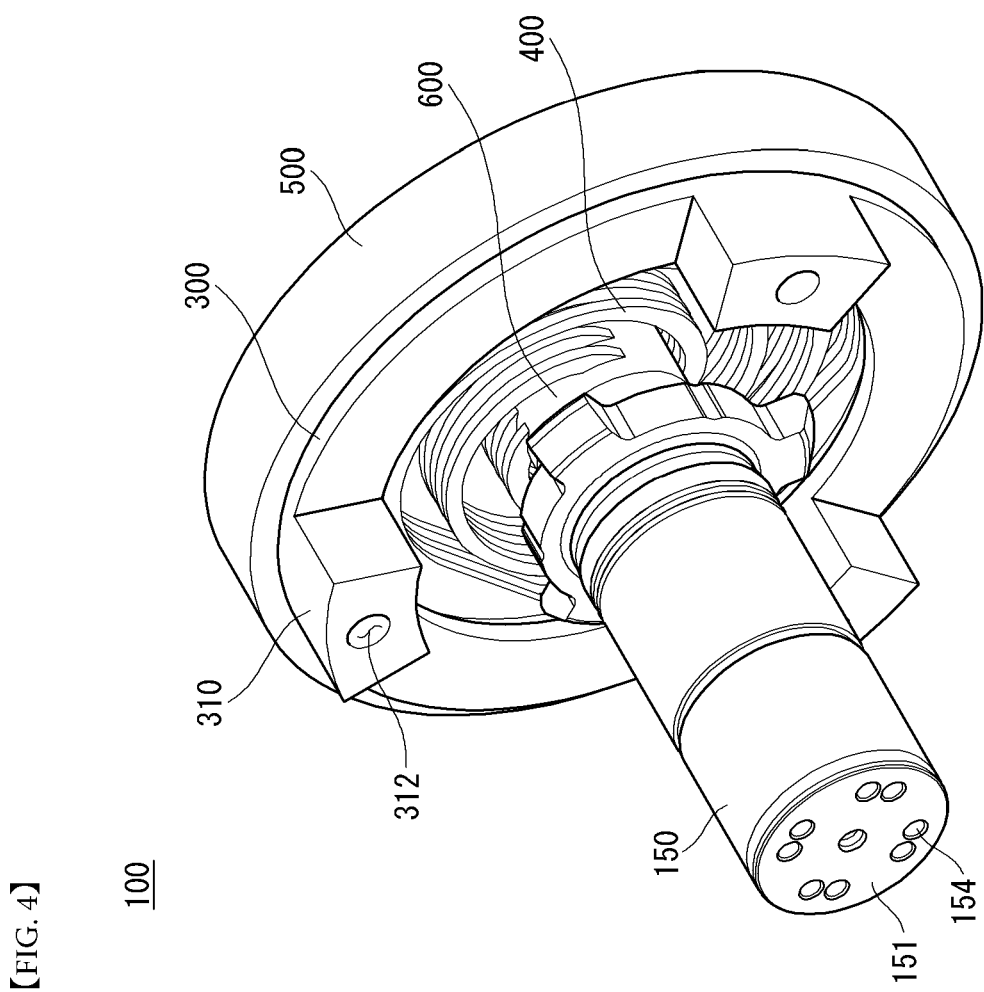
[FIG. 4]

[FIG. 5]
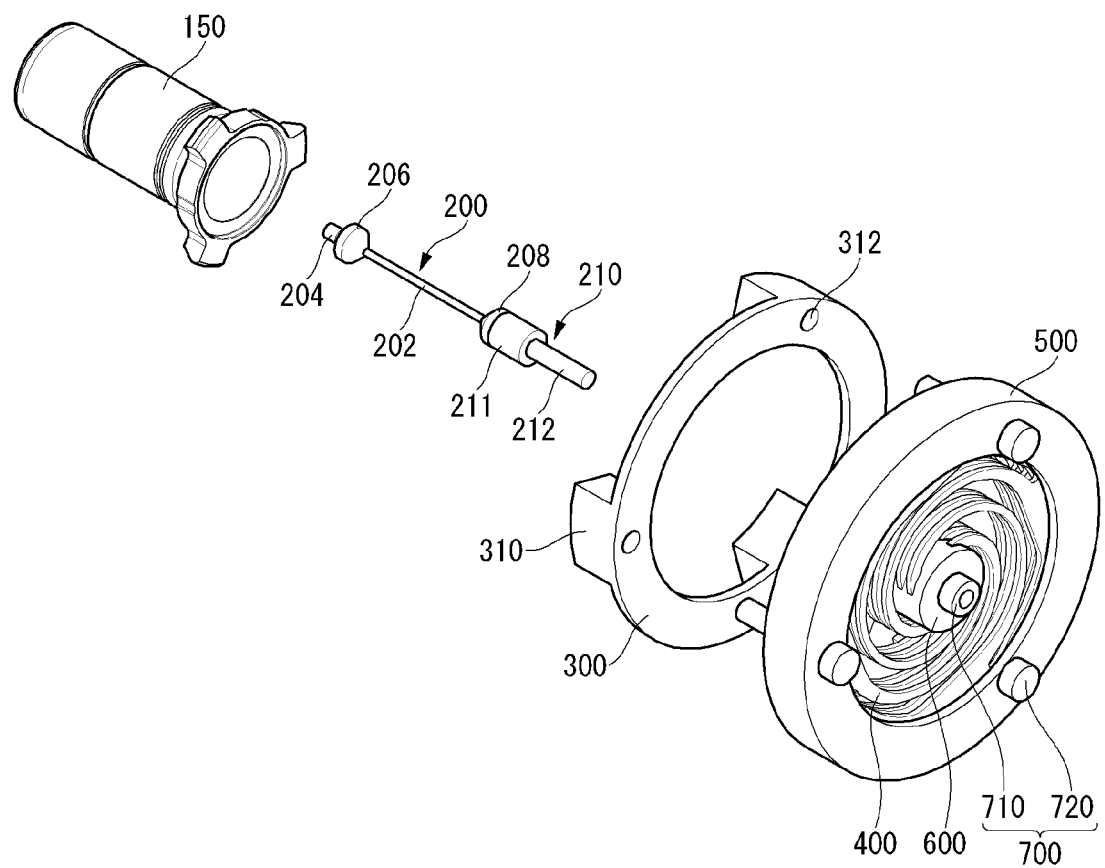

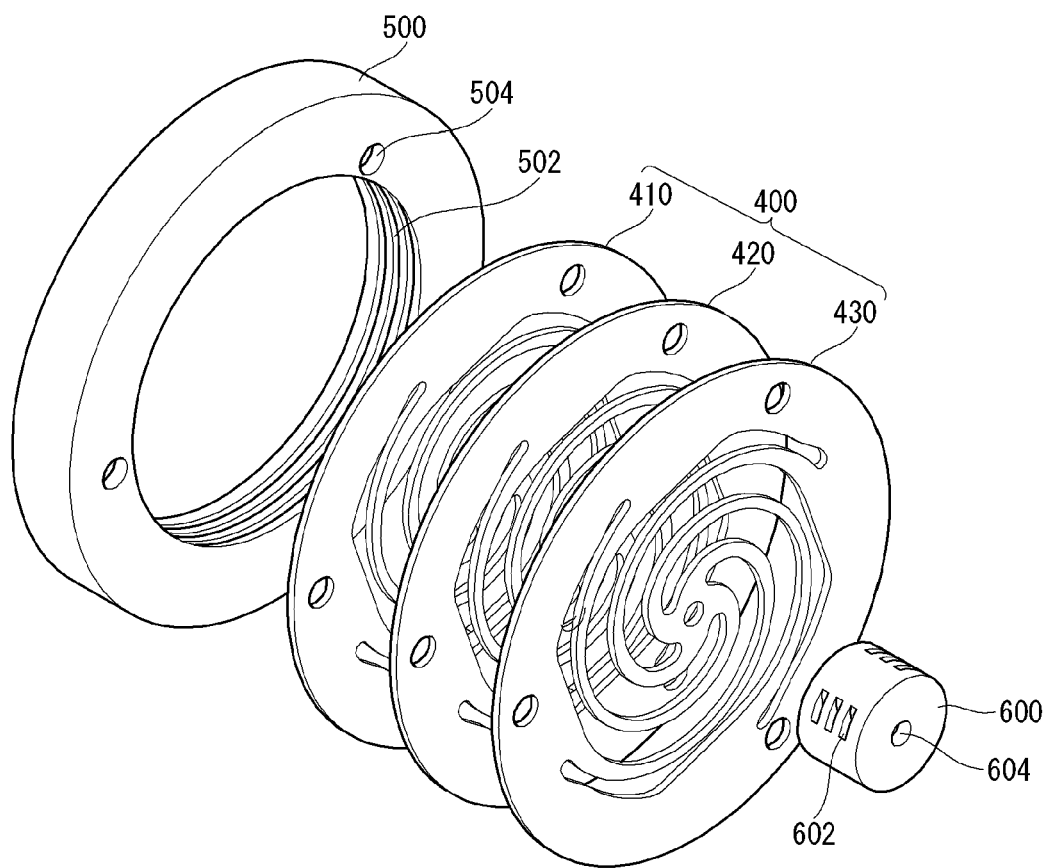
[FIG. 6]

[FIG. 7]
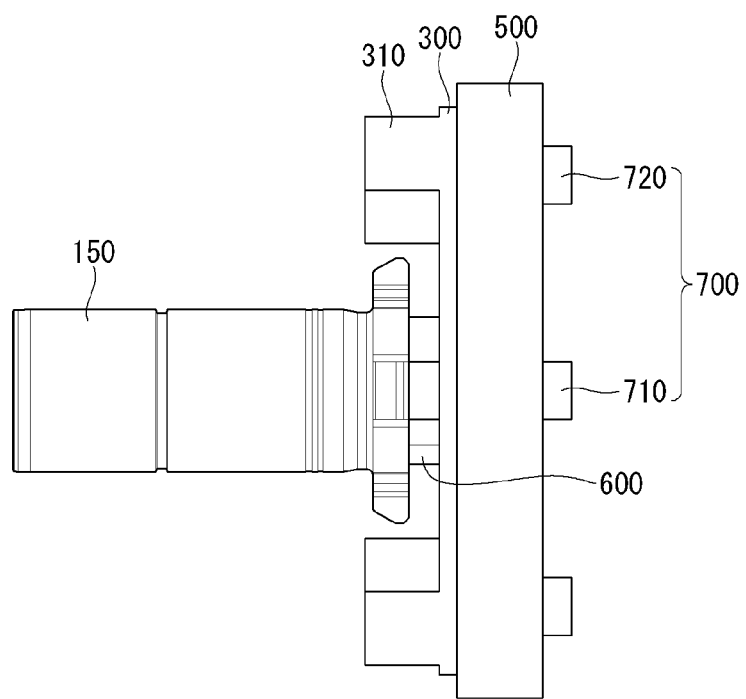

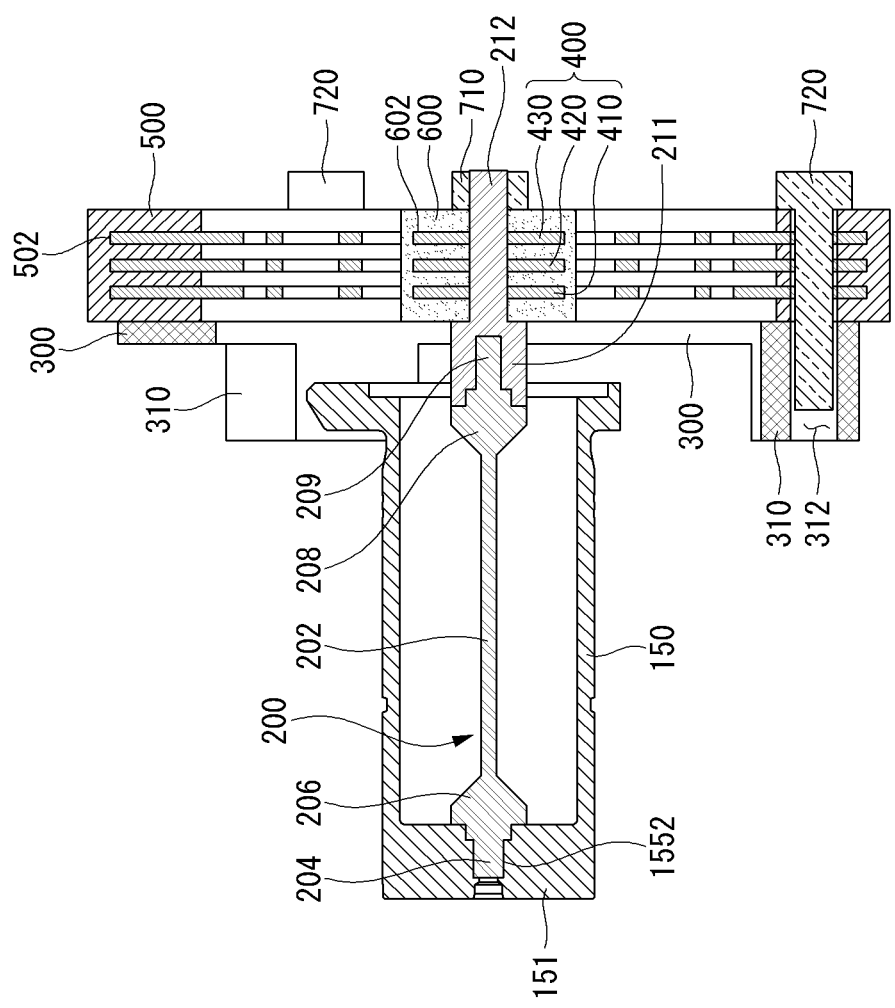
[FIG. 8]

[FIG. 9]
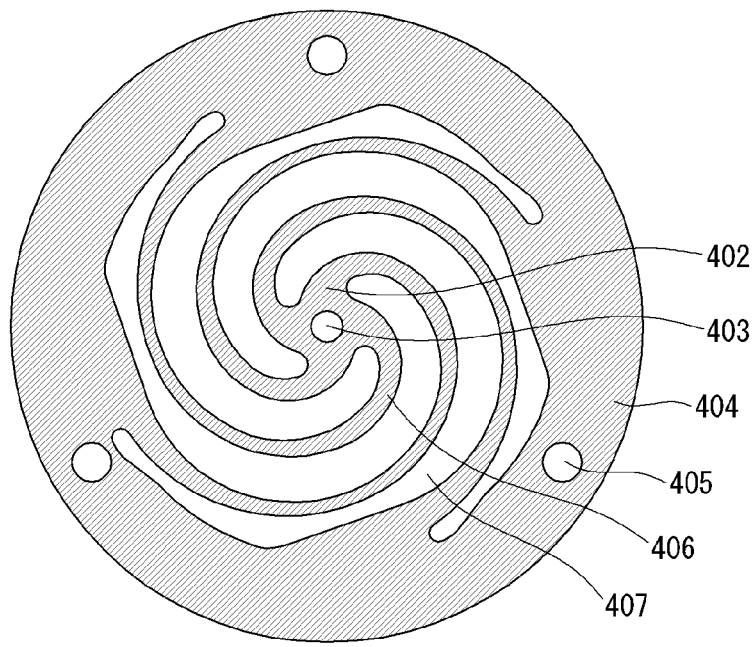
[FIG. 10]
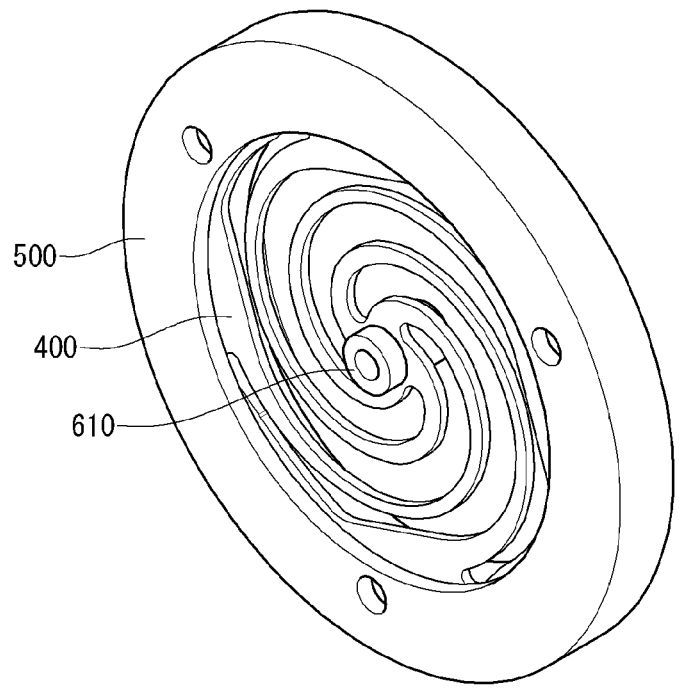

[FIG. 11]
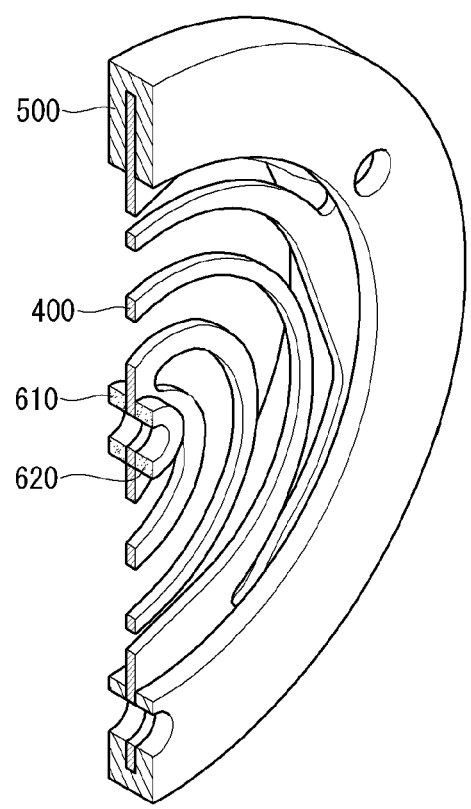

[FIG. 12]
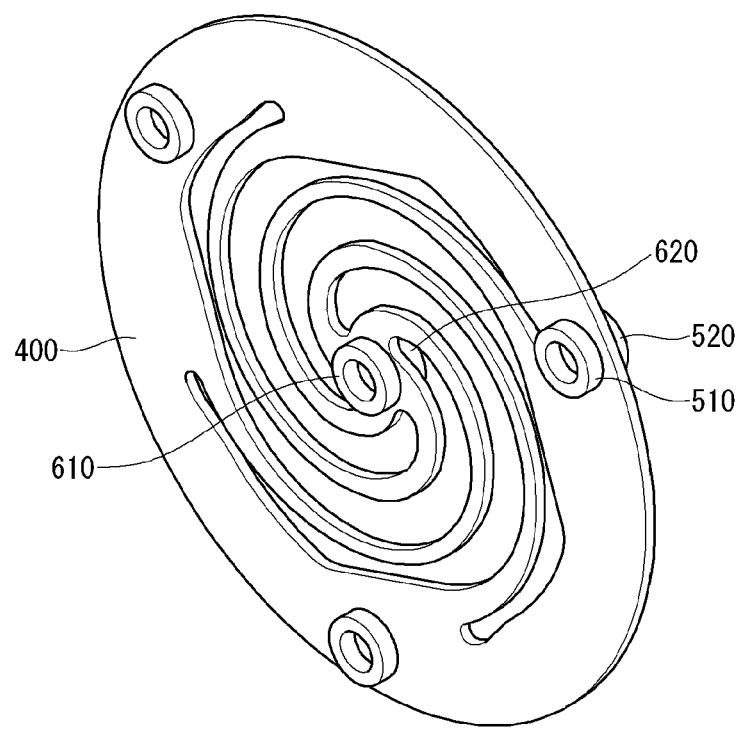

[FIG. 13]
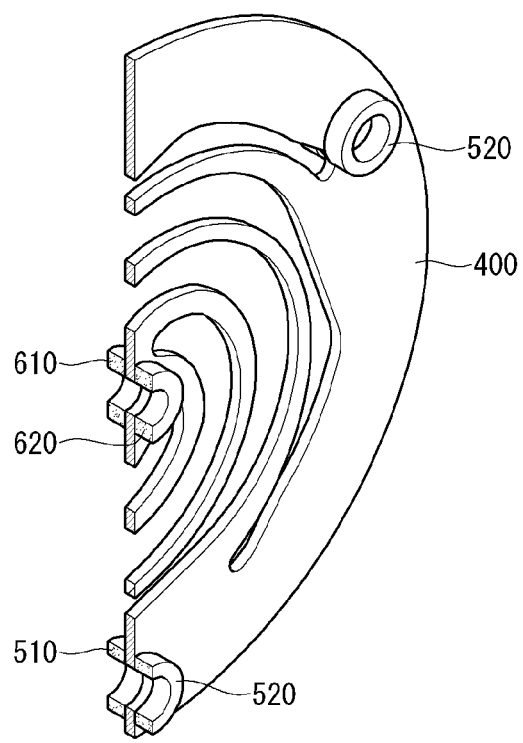

[FIG. 14]
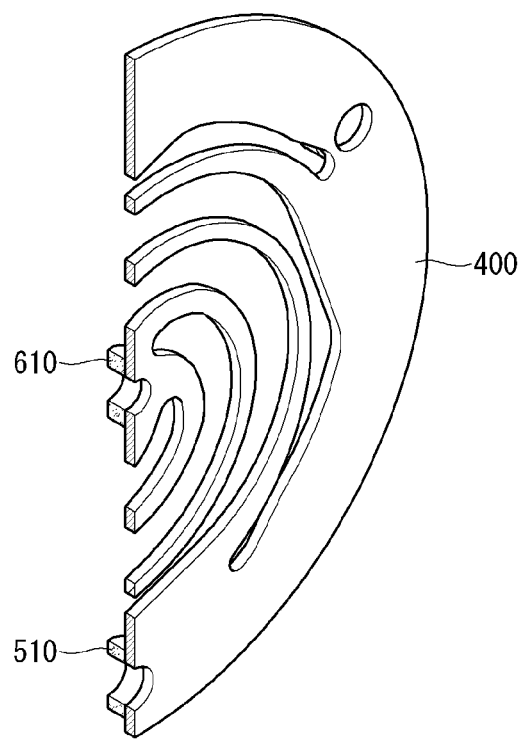

COMPRESSOR

CROSS-REFERENCE TO RELATED APPLICATIONS

This application is the National Stage filing under 35 U.S.C. 371 of International Application No. PCT/KR2020/004388, filed on Mar. 31, 2020, which claims the benefit of Korean Patent Application No. 10-2020-0006189, filed on Jan. 16, 2020, the contents of which are all hereby incorporated by reference herein in their entirety.

TECHNICAL FIELD

The present disclosure relates to a compressor. More specifically, the present disclosure relates to a linear compressor for compressing a refrigerant by a linear reciprocating motion of a piston.

BACKGROUND ART

In general, a compressor refers to a device that is configured to receive power from a power generator such as a motor or a turbine and compress a working fluid such as air or refrigerant. More specifically, the compressors are widely used in the whole industry or home appliances, such as for a steam compression refrigeration cycle (hereinafter, referred to as "refrigeration cycle").

The compressors may be classified into a reciprocating compressor, a rotary compressor, and a scroll compressor according to a method of compressing the refrigerant.

The reciprocating compressor uses a method in which a compression space is formed between a piston and a cylinder, and the piston linearly reciprocates to compress a fluid. The rotary compressor uses a method of compressing a fluid by a roller that eccentrically rotates inside a cylinder. The scroll compressor uses a method of compressing a fluid by engaging and rotating a pair of spiral scrolls.

Recently, among the reciprocating compressors, the use of linear compressors that uses a linear reciprocating motion without using a crank shaft is gradually increasing. The linear compressor has advantages in that it has less mechanical loss resulting from switching a rotary motion to the linear reciprocating motion and thus can improve the efficiency, and has a relatively simple structure.

The linear compressor is configured such that a cylinder is positioned in a casing forming a sealed space to form a compression chamber, and a piston covering the compression chamber reciprocates in the cylinder. The linear compressor repeats a process in which a fluid in the sealed space is sucked into the compression chamber while the piston is positioned at a bottom dead center (BDC), and the fluid of the compression chamber is compressed and discharged while the piston is positioned at a top dead center (TDC).

A compression unit and a drive unit are installed inside the linear compressor. The compression unit performs a process of compressing and discharging a refrigerant while performing a resonant motion by a resonant spring through a movement generated in the drive unit.

The piston of the linear compressor repeatedly performs a series of processes of sucking the refrigerant into the casing through an intake pipe while reciprocating at high speed inside the cylinder by the resonant spring, and then discharging the refrigerant from a compression space through a forward movement of the piston to move it to a condenser through a discharge pipe.

The linear compressor may be classified into an oil lubricated linear compressor and a gas lubricated linear compressor according to a lubrication method.

The oil lubricated linear compressor is configured to store a predetermined amount of oil in the casing and lubricate between the cylinder and the piston using the oil.

On the other hand, the gas lubricated linear compressor is configured not to store an oil in the casing, induce a part of the refrigerant discharged from the compression space between the cylinder and the piston, and lubricate between the cylinder and the piston by a gas force of the refrigerant.

The oil lubricated linear compressor supplies the oil of a relatively low temperature between the cylinder and the piston and thus can suppress the cylinder and the piston from being overheated by motor heat or compression heat, etc. Hence, the oil lubricated linear compressor suppresses specific volume from increasing as the refrigerant passing through an intake flow path of the piston is sucked into the compression chamber of the cylinder and is heated, and thus can prevent in advance an intake loss from occurring.

However, when the refrigerant and an oil discharged to a refrigeration cycle device are not smoothly returned to the compressor, the oil lubricated linear compressor may experience an oil shortage in the casing of the compressor. The oil shortage in the casing may lead to a reduction in reliability of the compressor.

On the other hand, the gas lubricated linear compressor has advantages in that it can be made smaller than the oil lubricated linear compressor, and there is no reduction in the reliability of the compressor due to the oil shortage because it lubricates between the cylinder and the piston using the refrigerant.

However, there was a problem that damage to the product was caused since a lateral force was applied to the piston that reciprocates axially.

DISCLOSURE

Technical Problem

An object of the present disclosure is to provide a piston capable of distributing a lateral force applied to the piston and reducing manufacturing process of components.

Technical Solution

To achieve the above-described and other objects, in one aspect of the present disclosure, there is provided a compressor, the compressor comprising the cylinder configured to form a compressed space of the refrigerant, the cylinder having a cylindrical shape; a piston configured to reciprocate axially in the cylinder, the piston comprising a guide portion having a cylindrical shape and a head portion disposed in front of the guide portion; an intake valve disposed at a front of the head portion; a fixing member disposed outside the piston; a rod comprising one end disposed at the head portion and configured to extend axially; a first elastic member connected to the fixing member and other side of the rod; a second elastic member disposed to be spaced apart from a rear of the first elastic member and connected to the fixing member and the other side of the rod; and a first spacer insert-injected with the first elastic member and the second elastic member.

Hence, the present disclosure can distribute a lateral force applied to the piston through the rod that axially extends in the piston.

Further, since the first spacer is insert-injected with the first elastic member and the second elastic member, the present disclosure can improve rigidity of the product and reduce the manufacturing process of components.

The first elastic member comprises a first inner portion connected to the other side of the rod, a first outer portion connected to the fixing member, and a first connection portion connecting the first inner portion and the first outer portion. The second elastic member comprises a second inner portion axially overlapping the first inner portion, a second outer portion axially overlapping the first outer portion, and a second connection portion connecting the second inner portion and the second outer portion.

The first spacer may comprise an inner spacer insert-injected with the first inner portion and the second inner portion. The inner spacer may cover a front surface, an outer surface, and a rear surface of the first inner portion and a front surface, an outer surface, and a rear surface of the second inner portion.

The inner spacer may comprise a first hole formed in a central area, and the first inner portion may comprise a first inner hole that is formed in the central area and axially overlaps the first hole. The second inner portion may comprise a second inner hole that is formed in the central area and axially overlaps the first hole, and other end of the rod may axially overlap the first hole, the first inner hole, and the second inner hole.

The compressor may further comprise a coupling member coupled to the other end of the rod, and the coupling member may pass through the first hole, the first inner hole, and the second inner hole.

The compressor may further comprise a first fastening member configured to fix other end of the coupling member to a rear surface of the inner spacer.

A radius of the coupling member may be greater than a radius of a central area of the rod, and one side of the coupling member may be formed in a shape corresponding to the other end of the rod.

The first spacer may comprise an outer spacer insert-injected with the first outer portion and the second outer portion. The outer spacer may cover a front surface, an outer surface, and a rear surface of the first outer portion and a front surface, an outer surface, and a rear surface of the second outer portion.

The compressor may further comprise a second fastening member configured to couple the outer spacer, the first outer portion, and the second outer portion to the fixing member.

The outer spacer may comprise a second hole axially overlapping the fixing member, and the first outer portion may comprise a first outer hole axially overlapping the second hole. The second outer portion may comprise a second outer hole axially overlapping the second hole, and the fixing member comprises a fastening hole axially overlapping the second hole. The second fastening member may pass through the second hole, the first outer hole, the second outer hole, and the fastening hole.

The fixing member may comprise an extension that extends forward at a position axially overlapping the second hole.

The first connection portion may comprise a plurality of first connection members that is formed in a spiral shape and is spaced apart from each other, and the second connection portion may comprise a plurality of second connection members that is formed in a spiral shape and is spaced apart from each other.

A rear surface of the piston and the first elastic member may be axially spaced apart from each other. The refrigerant at a rear of the piston may be introduced into the piston via a space between the plurality of first connection members, a space between the plurality of second connection members, and a space between the rear surface of the piston and the first elastic member.

The compressor may further comprise a second spacer disposed between a rear surface of the first inner portion and a front surface of the second inner portion, and the first spacer may comprise an outer spacer insert-injected with the first outer portion and the second outer portion.

The head portion of the piston may comprise a rod groove formed in a central area, and the one end of the rod may be disposed in the rod groove.

The first elastic member and the second elastic member each may comprise a leaf spring.

To achieve the above-described and other objects, in another aspect of the present disclosure, there is provided a compressor comprising the cylinder configured to form a compressed space of the refrigerant, the cylinder having a cylindrical shape; a piston configured to reciprocate axially in the cylinder, the piston comprising a guide portion having a cylindrical shape and a head portion disposed in front of the guide portion; an intake valve disposed at a front of the head portion; a fixing member disposed outside the piston; a rod comprising one end disposed at the head portion and configured to extend axially; a first elastic member connected to the fixing member and other side of the rod; a second elastic member disposed to be spaced apart from a rear of the first elastic member and connected to the fixing member and the other side of the rod; and a spacer disposed between the first elastic member and the second elastic member.

Hence, the present disclosure can distribute a lateral force applied to the piston through the rod that axially extends in the piston.

The first elastic member may comprise a first inner portion connected to other end of the rod, a first outer portion connected to the fixing member, and a first connection portion connecting the first inner portion and the first outer portion. The second elastic member may comprise a second inner portion axially overlapping the first inner portion, a second outer portion axially overlapping the first outer portion, and a second connection portion connecting the second inner portion and the second outer portion.

The first inner portion may comprise a first inner hole formed in the central area, and the second inner portion may comprise a second inner hole that is formed in the central area and axially overlaps the first inner hole. The other end of the rod may axially overlap the first inner hole and the second inner hole, and the spacer may be disposed between the first inner portion and the second inner portion and disposed adjacent to the first inner hole or the second inner hole.

The first outer portion may comprise a first outer hole, and the second outer portion may comprise a second outer hole axially overlapping the first outer hole. The spacer may be disposed between the first outer portion and the second outer portion and disposed adjacent to the first outer hole or the second outer hole.

Advantageous Effects

The present disclosure can provide a piston capable of distributing a lateral force applied to the piston and reducing the manufacturing process of components.

DESCRIPTION OF DRAWINGS

FIG. 1 is a perspective view of a compressor according to an embodiment of the present disclosure.

FIG. 2 is a cross-sectional view of a compressor according to an embodiment of the present disclosure.

FIGS. 3 and 4 are perspective views of partial configuration of a compressor according to an embodiment of the present disclosure.

FIG. 5 is an exploded perspective view of partial configuration of a compressor according to an embodiment of the present disclosure.

FIG. 6 is an exploded perspective view of partial configuration of FIG. 5.

FIG. 7 is a side view of partial configuration of a compressor according to an embodiment of the present disclosure.

FIG. 8 is a cross-sectional view of partial configuration of a compressor according to an embodiment of the present disclosure.

FIG. 9 is a plan view of an elastic member according to an embodiment of the present disclosure.

FIGS. 10 and 11 are perspective views of an elastic member and a spacer according to another embodiment of the present disclosure.

FIGS. 12 and 13 are perspective views of an elastic member and a spacer according to yet another embodiment of the present disclosure.

FIG. 14 is a perspective view of an elastic member and a spacer according to still yet another embodiment of the present disclosure.

BEST MODE

Reference will now be made in detail to embodiments of the present disclosure, examples of which are illustrated in the accompanying drawings. Wherever possible, the same reference numbers will be used throughout the drawings to refer to the same or like parts.

It should be understood that when a component is described as being "connected to" or "coupled to" other component, it may be directly connected or coupled to the other component or intervening component(s) may be present.

It will be noted that a detailed description of known arts will be omitted if it is determined that the detailed description of the known arts can obscure embodiments of the present disclosure. The accompanying drawings are used to help easily understand various technical features and it should be understood that embodiments presented herein are not limited by the accompanying drawings. As such, the present disclosure should be understood to extend to any alterations, equivalents and substitutes in addition to those which are particularly set out in the accompanying drawings.

In addition, a term of "disclosure" may be replaced by document, specification, description, etc.

FIG. 1 is a perspective view of a compressor according to an embodiment of the present disclosure.

Referring to FIG. 1, a linear compressor 100 according to an embodiment of the present disclosure may include a shell 111 and shell covers 112 and 113 coupled to the shell 111. In a broad sense, the shell covers 112 and 113 can be understood as one configuration of the shell 111.

Legs 20 may be coupled to a lower side of the shell 111. The legs 20 may be coupled to a base of a product on which the linear compressor 100 is mounted. For example, the product may include a refrigerator, and the base may include a machine room base of the refrigerator. As another example, the product may include an outdoor unit of an air conditioner, and the base may include a base of the outdoor unit.

The shell 111 may have a substantially cylindrical shape and may be disposed to lie in a horizontal direction or an axial direction. FIG. 1 illustrates that the shell 111 is extended in the horizontal direction and has a slightly low height in a radial direction, by way of example. That is, since the linear compressor 100 can have a low height, there is an advantage in that a height of the machine room can decrease when the linear compressor 100 is installed in, for example, the machine room base of the refrigerator.

A longitudinal central axis of the shell 111 coincides with a central axis of a main body of the compressor 100 to be described below, and the central axis of the main body of the compressor 100 coincides with a central axis of a cylinder 140 and a piston 150 that constitute the main body of the compressor 100.

A terminal 30 may be installed on an outer surface of the shell 111. The terminal 30 may transmit external electric power to a drive unit 130 of the linear compressor 100. More specifically, the terminal 30 may be connected to a lead line of a coil 132b.

A bracket 31 may be installed on the outside of the terminal 30. The bracket 31 may include a plurality of brackets surrounding the terminal 30. The bracket 31 may perform a function of protecting the terminal 30 from an external impact, etc.

Both sides of the shell 111 may be opened. The shell covers 112 and 113 may be coupled to both sides of the opened shell 111. More specifically, the shell covers 112 and 113 may include a first shell cover 112 coupled to one opened side of the shell 111 and a second shell cover 113 coupled to the other opened side of the shell 111. An inner space of the shell 111 may be sealed by the shell covers 112 and 113.

FIG. 1 illustrates that the first shell cover 112 is positioned on the right side of the linear compressor 100, and the second shell cover 113 is positioned on the left side of the linear compressor 100, by way of example. In other words, the first and second shell covers 112 and 113 may be disposed to face each other. It can be understood that the first shell cover 112 is positioned on an intake side of a refrigerant, and the second shell cover 113 is positioned on a discharge side of the refrigerant.

The linear compressor 100 may include a plurality of pipes 114, 115, and 40 that are included in the shell 111 or the shell covers 112 and 113 and can suck, discharge, or inject the refrigerant.

The plurality of pipes 114, 115, and 40 may include an intake pipe 114 that allows the refrigerant to be sucked into the linear compressor 100, a discharge pipe 115 that allows the compressed refrigerant to be discharged from the linear compressor 100, and a supplementary pipe 40 for supplementing the refrigerant in the linear compressor 100.

For example, the intake pipe 114 may be coupled to the first shell cover 112. The refrigerant may be sucked into the linear compressor 100 along the axial direction through the intake pipe 114.

The discharge pipe 115 may be coupled to an outer circumferential surface of the shell 111. The refrigerant sucked through the intake pipe 114 may be compressed while flowing in the axial direction. The compressed refrigerant may be discharged through the discharge pipe 115. The discharge pipe 115 may be disposed closer to the second shell cover 113 than to the first shell cover 112.

The supplementary pipe 40 may be coupled to the outer circumferential surface of the shell 111. A worker may inject the refrigerant into the linear compressor 100 through the supplementary pipe 40.

The supplementary pipe 40 may be coupled to the shell 111 at a different height from the discharge pipe 115 in order to prevent interference with the discharge pipe 115. Herein, the height may be understood as a distance measured from the leg 20 in a vertical direction. Because the discharge pipe 115 and the supplementary pipe 40 are coupled to the outer circumferential surface of the shell 111 at different heights, the work convenience can be attained.

On an inner circumferential surface of the shell 111 corresponding to a location at which the supplementary pipe 40 is coupled, at least a portion of the second shell cover 113 may be positioned adjacently. In other words, at least a portion of the second shell cover 113 may act as a resistance of the refrigerant injected through the supplementary pipe 40.

Thus, with respect to a flow path of the refrigerant, a size of the flow path of the refrigerant introduced through the supplementary pipe 40 is configured to decrease by the second shell cover 113 while the refrigerant enters into the inner space of the shell 111, and to increase again while the refrigerant passes through the second shell cover 113. In this process, a pressure of the refrigerant may be reduced to vaporize the refrigerant, and an oil contained in the refrigerant may be separated. Thus, while the refrigerant, from which the oil is separated, is introduced into the piston 150, a compression performance of the refrigerant can be improved. The oil may be understood as a working oil present in a cooling system.

FIG. 2 is a cross-sectional view illustrating a structure of the compressor 100.

Hereinafter, the compressor 100 according to the present disclosure will be described taking, as an example, a linear compressor that sucks and compresses a fluid while a piston linearly reciprocates, and discharges the compressed fluid.

The linear compressor may be a component of a refrigeration cycle, and the fluid compressed in the linear compressor may be a refrigerant circulating the refrigeration cycle. The refrigeration cycle may include a condenser, an expander, an evaporator, etc., in addition to the compressor. The linear compressor may be used as a component of the cooling system of the refrigerator, but is not limited thereto. The linear compressor can be widely used in the whole industry.

Referring to FIG. 2, the compressor 100 may include a casing 110 and a main body received in the casing 110. The main body of the compressor 100 may include a frame 120, the cylinder 140 fixed to the frame 120, the piston 150 that linearly reciprocates inside the cylinder 140, the drive unit 130 that is fixed to the frame 120 and gives a driving force to the piston 150, and the like. Here, the cylinder 140 and the piston 150 may be referred to as compression units 140 and 150.

The compressor 100 may include a bearing means for reducing a friction between the cylinder 140 and the piston 150. The bearing means may be an oil bearing or a gas bearing. Alternatively, a mechanical bearing may be used as the bearing means.

The main body of the compressor 100 may be elastically supported by support springs 116 and 117 installed at both ends in the casing 110. The support springs 116 and 117 may include a first support spring 116 for supporting the rear of the main body and a second support spring 117 for supporting a front of the main body. The support springs 116 and 117 may include a leaf spring. The support springs 116 and 117 can absorb vibrations and impacts generated by a reciprocating motion of the piston 150 while supporting the internal parts of the main body of the compressor 100.

The casing 110 may define a sealed space. The sealed space may include an accommodation space 101 in which the sucked refrigerant is received, an intake space 102 which is filled with the refrigerant before the compression, a compression space 103 in which the refrigerant is compressed, and a discharge space 104 which is filled with the compressed refrigerant.

The refrigerant sucked from the intake pipe 114 connected to the rear side of the casing 110 may be filled in the accommodation space 101, and the refrigerant in the intake space 102 communicating with the accommodation space 101 may be compressed in the compression space 103, discharged into the discharge space 104, and discharged to the outside through the discharge pipe 115 connected to the front side of the casing 110.

The casing 110 may include the shell 111 formed in a substantially cylindrical shape that is open at both ends and is long in a transverse direction, the first shell cover 112 coupled to the rear side of the shell 111, and the second shell cover 113 coupled to the front side of the shell 111. Here, it can be understood that the front side is the left side of the figure and is a direction in which the compressed refrigerant is discharged, and the rear side is the right side of the figure and is a direction in which the refrigerant is introduced. Further, the first shell cover 112 and the second shell cover 113 may be formed as one body with the shell 11.

The casing 110 may be formed of a thermally conductive material. Hence, heat generated in the inner space of the casing 110 can be quickly dissipated to the outside.

The first shell cover 112 may be coupled to the shell 111 in order to seal the rear of the shell 111, and the intake pipe 114 may be inserted and coupled to the center of the first shell cover 112.

The rear of the main body of the compressor 100 may be elastically supported by the first support spring 116 in the radial direction of the first shell cover 112.

The first support spring 116 may include a circular leaf spring. An edge of the first support spring 116 may be elastically supported by a support bracket 123a in a forward direction with respect to a back cover 123. An opened center portion of the first support spring 116 may be supported by an intake guide 116a in a rearward direction with respect to the first shell cover 112.

The intake guide 116a may have a through passage formed therein. The intake guide 116a may be formed in a cylindrical shape. A front outer circumferential surface of the intake guide 116a may be coupled to a central opening of the first support spring 116, and a rear end of the intake guide 116a may be supported by the first shell cover 112. In this instance, a separate intake support member 116b may be interposed between the intake guide 116a and an inner surface of the first shell cover 112.

A rear side of the intake guide 116a may communicate with the intake pipe 114, and the refrigerant sucked through the intake pipe 114 may pass through the intake guide 116a and may be smoothly introduced into a muffler unit 160 to be described below.

A damping member 116c may be disposed between the intake guide 116a and the intake support member 116b. The damping member 116c may be formed of a rubber material or the like. Hence, a vibration that may occur in the process of sucking the refrigerant through the intake pipe 114 can be prevented from being transmitted to the first shell cover 112.

The second shell cover 113 may be coupled to the shell 111 to seal the front side of the shell 111, and the discharge pipe 115 may be inserted and coupled through a loop pipe 115a. The refrigerant discharged from the compression space 103 may pass through a discharge cover assembly 180 and then may be discharged into the refrigeration cycle through the loop pipe 115a and the discharge pipe 115.

A front side of the main body of the compressor 100 may be elastically supported by the second support spring 117 in the radial direction of the shell 111 or the second shell cover 113.

The second support spring 117 may include a circular leaf spring. An opened center portion of the second support spring 117 may be supported by a first support guide 117b in a rearward direction with respect to the discharge cover assembly 180. An edge of the second support spring 117 may be supported by a support bracket 117a in a forward direction with respect to the inner surface of the shell 111 or the inner circumferential surface of the shell 111 adjacent to the second shell cover 113.

Unlike FIG. 2, the edge of the second support spring 117 may be supported in the forward direction with respect to the inner surface of the shell 111 or the inner circumferential surface of the shell 111 adjacent to the second shell cover 113 through a separate bracket (not shown) coupled to the second shell cover 113.

The first support guide 117b may be formed in a cylindrical shape. A cross section of the first support guide 117b may have a plurality of diameters. A front side of the first support guide 117b may be inserted into a central opening of the second support spring 117, and a rear side of the first support guide 117b may be inserted into a central opening of the discharge cover assembly 180. A support cover 117c may be coupled to the front side of the first support guide 117b with the second support spring 117 interposed therebetween. A cup-shaped second support guide 117d that is recessed rearward may be coupled to the front side of the support cover 117c. A cup-shaped third support guide 117e that corresponds to the second support guide 117d and is recessed forward may be coupled to the inside of the second shell cover 113. The second support guide 117d may be inserted into the third support guide 117e and may be supported in the axial direction and/or the radial direction. In this instance, a gap may be formed between the second support guide 117d and the third support guide 117e.

The frame 120 may include a body portion 121 supporting the outer circumferential surface of the cylinder 140, and a first flange portion 122 that is connected to one side of the body portion 121 and supports the drive unit 130. The frame 120 may be elastically supported with respect to the casing 110 by the first and second support springs 116 and 117 together with the drive unit 130 and the cylinder 140.

The body portion 121 may wrap the outer circumferential surface of the cylinder 140. The body portion 121 may be formed in a cylindrical shape. The first flange portion 122 may extend from a front end of the body portion 121 in the radial direction.

The cylinder 140 may be coupled to an inner circumferential surface of the body portion 121. An inner stator 134 may be coupled to an outer circumferential surface of the body portion 121. For example, the cylinder 140 may be pressed and fitted to the inner circumferential surface of the body portion 121, and the inner stator 134 may be fixed using a separate fixing ring (not shown).

An outer stator 131 may be coupled to a rear surface of the first flange portion 122, and the discharge cover assembly 180 may be coupled to a front surface of the first flange portion 122. For example, the outer stator 131 and the discharge cover assembly 180 may be fixed through a mechanical coupling means.

On one side of the front surface of the first flange portion 122, a bearing inlet groove 125a forming a part of the gas bearing may be formed, a bearing communication hole 125b penetrating from the bearing inlet groove 125a to the inner circumferential surface of the body portion 121 may be formed, and a gas groove 125c communicating with the bearing communication hole 125b may be formed on the inner circumferential surface of the body portion 121.

The bearing inlet groove 125a may be recessed to a predetermined depth along the axial direction. The bearing communication hole 125b is a hole having a smaller cross-sectional area than the bearing inlet groove 125a and may be inclined toward the inner circumferential surface of the body portion 121. The gas groove 125c may be formed in an annular shape having a predetermined depth and an axial length on the inner circumferential surface of the body portion 121. Alternatively, the gas groove 125c may be formed on the outer circumferential surface of the cylinder 140 in contact with the inner circumferential surface of the body portion 121, or formed on both the inner circumferential surface of the body portion 121 and the outer circumferential surface of the cylinder 140.

In addition, a gas inlet 142 corresponding to the gas groove 125c may be formed on the outer circumferential surface of the cylinder 140. The gas inlet 142 forms a kind of nozzle in the gas bearing.

The frame 120 and the cylinder 140 may be formed of aluminum or an aluminum alloy material.

The cylinder 140 may be formed in a cylindrical shape in which both ends are opened. The piston 150 may be inserted through a rear end of the cylinder 140. A front end of the cylinder 140 may be closed via a discharge valve assembly 170. The compression space 103 may be formed between the cylinder 140, a front end of the piston 150, and the discharge valve assembly 170. Here, the front end of the piston 150 may be referred to as a head portion 151. The volume of the compression space 103 increases when the piston 150 moves backward, and decreases as the piston 150 moves forward. That is, the refrigerant introduced into the compression space 103 may be compressed while the piston 150 moves forward, and may be discharged through the discharge valve assembly 170.

The cylinder 140 may include a second flange portion 141 disposed at the front end. The second flange portion 141 may bend to the outside of the cylinder 140. The second flange portion 141 may extend in an outer circumferential direction of the cylinder 140. The second flange portion 141 of the cylinder 140 may be coupled to the frame 120. For example, the front end of the frame 120 may include a flange groove corresponding to the second flange portion 141 of the cylinder 140, and the second flange portion 141 of the cylinder 140 may be inserted into the flange groove and coupled through a coupling member.

A gas bearing means may be provided to supply a discharge gas to a gap between the outer circumferential surface of the piston 150 and the outer circumferential surface of the cylinder 140 and lubricate between the cylinder 140 and the piston 150 with gas. The discharge gas between the cylinder 140 and the piston 150 may provide a levitation force to the piston 150 to reduce a friction generated between the piston 150 and the cylinder 140.

For example, the cylinder 140 may include the gas inlet 142. The gas inlet 142 may communicate with the gas groove 125c formed on the inner circumferential surface of the body portion 121. The gas inlet 142 may pass through the cylinder 140 in the radial direction. The gas inlet 142 may guide the compressed refrigerant introduced in the gas groove 125c between the inner circumferential surface of the cylinder 140 and the outer circumferential surface of the piston 150. Alternatively, the gas groove 125c may be formed on the outer circumferential surface of the cylinder 140 in consideration of the convenience of processing.

An entrance of the gas inlet 142 may be formed relatively widely, and an exit of the gas inlet 142 may be formed as a fine through hole to serve as a nozzle. The entrance of the gas inlet 142 may further include a filter (not shown) blocking the inflow of foreign matter. The filter may be a metal mesh filter, or may be formed by winding a member such as fine thread.

The plurality of gas inlets 142 may be independently formed. Alternatively, the entrance of the gas inlet 142 may be formed as an annular groove, and a plurality of exits may be formed along the annular groove at regular intervals. The gas inlet 142 may be formed only at the front side based on the axial direction center of the cylinder 140. On the contrary, the gas inlet 142 may be formed at the rear side based on the axial direction center of the cylinder 140 in consideration of the sagging of the piston 150.

The piston 150 is inserted into the opened rear end of the cylinder 140 and is provided to seal the rear of the compression space 103.

The piston 150 may include a head portion 151 and a guide portion 152. The head portion 151 may be formed in a disc shape. The head portion 151 may be partially open. The head portion 151 may partition the compression space 103. The guide portion 152 may extend rearward from an outer circumferential surface of the head portion 151. The guide portion 152 may be formed in a cylindrical shape. The inside of the guide portion 152 may be empty, and a front of the guide portion 152 may be partially sealed by the head portion 151. A rear of the guide portion 152 may be opened and connected to the muffler unit 160. The head portion 151 may be provided as a separate member coupled to the guide portion 152. Alternatively, the head portion 151 and the guide portion 152 may be formed as one body.

The piston 150 may include an intake port 154. The intake port 154 may pass through the head portion 151. The intake port 154 may communicate with the intake space 102 and the compression space 103 inside the piston 150. For example, the refrigerant flowing from the accommodation space 101 to the intake space 102 in the piston 150 may pass through the intake port 154 and may be sucked into the compression space 103 between the piston 150 and the cylinder 140.

The intake port 154 may extend in the axial direction of the piston 150. The intake port 154 may be inclined in the axial direction of the piston 150. For example, the intake port 154 may extend to be inclined in a direction away from the central axis as it goes to the rear of the piston 150.

A cross section of the intake port 154 may be formed in a circular shape. The intake port 154 may have a constant inner diameter. In contrast, the intake port 154 may be formed as a long hole in which an opening extends in the radial direction of the head portion 151, or may be formed such that the inner diameter becomes larger as it goes to the rear.

The plurality of intake ports 154 may be formed in at least one of the radial direction and the circumferential direction of the head portion 151.

The head portion 151 of the piston 150 adjacent to the compression space 103 may be equipped with an intake valve 155 for selectively opening and closing the intake port 154. The intake valve 155 may operate by elastic deformation to open or close the intake port 154. That is, the intake valve 155 may be elastically deformed to open the intake port 154 by the pressure of the refrigerant flowing into the compression space 103 through the intake port 154.

The piston 150 may be connected to a mover 135. The mover 135 may reciprocate forward and backward according to the movement of the piston 150. The inner stator 134 and the cylinder 140 may be disposed between the mover 135 and the piston 150. The mover 135 and the piston 150 may be connected to each other by a magnet frame 136 that is formed by detouring the cylinder 140 and the inner stator 134 to the rear.

The muffler unit 160 may be coupled to the rear of the piston 150 to reduce a noise generated in the process of sucking the refrigerant into the piston 150. The refrigerant sucked through the intake pipe 114 may flow into the intake space 102 in the piston 150 via the muffler unit 160.

The muffler unit 160 may include an intake muffler 161 communicating with the accommodation space 101 of the casing 110, and an inner guide 162 that is connected to a front of the intake muffler 161 and guides the refrigerant to the intake port 154.

The intake muffler 161 may be positioned behind the piston 150. A rear opening of the intake muffler 161 may be disposed adjacent to the intake pipe 114, and a front end of the intake muffler 161 may be coupled to the rear of the piston 150. The intake muffler 161 may have a flow path formed in the axial direction to guide the refrigerant in the accommodation space 101 to the intake space 102 inside the piston 150.

The inside of the intake muffler 161 may include a plurality of noise spaces partitioned by a baffle. The intake muffler 161 may be formed by combining two or more members. For example, a second intake muffler may be press-coupled to the inside of a first intake muffler to form a plurality of noise spaces. In addition, the intake muffler 161 may be formed of a plastic material in consideration of weight or insulation property.

One side of the inner guide 162 may communicate with the noise space of the intake muffler 161, and other side may be deeply inserted into the piston 150. The inner guide 162 may be formed in a pipe shape. Both ends of the inner guide 162 may have the same inner diameter. The inner guide 162 may be formed in a cylindrical shape. Alternatively, an inner diameter of a front end that is a discharge side of the inner guide 162 may be greater than an inner diameter of a rear end opposite the front end.

The intake muffler 161 and the inner guide 162 may be provided in various shapes and may adjust the pressure of the refrigerant passing through the muffler unit 160. The intake muffler 161 and the inner guide 162 may be formed as one body.

The discharge valve assembly 170 may include a discharge valve 171 and a valve spring 172 that is provided on a front side of the discharge valve 171 to elastically support the discharge valve 171. The discharge valve assembly 170 may selectively discharge the compressed refrigerant in the compression space 103. Here, the compression space 103 means a space between the intake valve 155 and the discharge valve 171.

The discharge valve 171 may be disposed to be supportable on the front surface of the cylinder 140. The discharge valve 171 may selectively open and close the front opening of the cylinder 140. The discharge valve 171 may operate by elastic deformation to open or close the compression space 103. The discharge valve 171 may be elastically deformed to open the compression space 103 by the pressure of the refrigerant flowing into the discharge space 104 through the compression space 103. For example, the compression space 103 may maintain a sealed state while the discharge valve 171 is supported on the front surface of the cylinder 140, and the compressed refrigerant of the compression space 103 may be discharged into an opened space in a state where the discharge valve 171 is spaced apart from the front surface of the cylinder 140.

The valve spring 172 may be provided between the discharge valve 171 and the discharge cover assembly 180 to provide an elastic force in the axial direction. The valve spring 172 may be provided as a compression coil spring, or may be provided as a leaf spring in consideration of an occupied space or reliability.

When the pressure of the compression space 103 is equal to or greater than a discharge pressure, the valve spring 172 may open the discharge valve 171 while deforming forward, and the refrigerant may be discharged from the compression space 103 and discharged into a first discharge space 104a of the discharge cover assembly 180. When the discharge of the refrigerant is completed, the valve spring 172 provides a restoring force to the discharge valve 171 and thus can allow the discharge valve 171 to be closed.

A process of introducing the refrigerant into the compression space 103 through the intake valve 155 and discharging the refrigerant of the compression space 103 into the discharge space 104 through the discharge valve 171 is described as follows.

In the process in which the piston 150 linearly reciprocates in the cylinder 140, when the pressure of the compression space 103 is equal to or less than a predetermined intake pressure, the intake valve 155 is opened and thus the refrigerant is sucked into a compression space 103. On the other hand, when the pressure of the compression space 103 exceeds the predetermined intake pressure, the refrigerant of the compression space 103 is compressed in a state in which the intake valve 155 is closed.

When the pressure of the compression space 103 is equal to or greater than the predetermined intake pressure, the valve spring 172 deforms forward and opens the discharge valve 171 connected to the valve spring 172, and the refrigerant is discharged from the compression space 103 to the discharge space 104 of the discharge cover assembly 180. When the discharge of the refrigerant is completed, the valve spring 172 provides a restoring force to the discharge valve 171 and allows the discharge valve 171 to be closed, thereby sealing a front of the compression space 103.

The discharge cover assembly 180 is installed at the front of the compression space 103, forms a discharge space 104 for receiving the refrigerant discharged from the compression space 103, and is coupled to a front of the frame 120 to thereby reduce a noise generated in the process of discharging the refrigerant from the compression space 103. The discharge cover assembly 180 may be coupled to a front of the first flange portion 122 of the frame 120 while receiving the discharge valve assembly 170. For example, the discharge cover assembly 180 may be coupled to the first flange portion 122 through a mechanical coupling member.

An O-ring 166 may be provided between the discharge cover assembly 180 and the frame 120 to prevent the refrigerant in a gasket 165 for thermal insulation and the discharge space 104 from leaking.

The discharge cover assembly 180 may be formed of a thermally conductive material. Therefore, when a high temperature refrigerant is introduced into the discharge cover assembly 180, heat of the refrigerant may be transferred to the casing 110 through the discharge cover assembly 180 and dissipated to the outside of the compressor.

The discharge cover assembly 180 may include one discharge cover, or may be arranged so that a plurality of discharge covers sequentially communicate with each other. When the discharge cover assembly 180 is provided with the plurality of discharge covers, the discharge space 104 may include a plurality of spaces partitioned by the respective discharge covers. The plurality of spaces may be disposed in a front-rear direction and may communicate with each other.

For example, when there are three discharge covers, the discharge space 104 may include a first discharge space 104a between the frame 120 and a first discharge cover 181 coupled to the front side of the frame 120, a second discharge space 104b between the first discharge cover 181 and a second discharge cover 182 that communicates with the first discharge space 104a and is coupled to a front side of the first discharge cover 181, and a third discharge space 104c between the second discharge cover 182 and a third discharge cover 183 that communicates with the second discharge space 104b and is coupled to a front side of the second discharge cover 182.

The first discharge space 104a may selectively communicate with the compression space 103 by the discharge valve 171, the second discharge space 104b may communicate with the first discharge space 104a, and the third discharge space 104c may communicate with the second discharge space 104b. Hence, as the refrigerant discharged from the compression space 103 sequentially passes through the first discharge space 104a, the second discharge space 104b, and the third discharge space 104c, a discharge noise can be reduced, and the refrigerant can be discharged to the outside of the casing 110 through the loop pipe 115a and the discharge pipe 115 communicating with the third discharge cover 183.

The drive unit 130 may include the outer stator 131 that is disposed between the shell 111 and the frame 120 and surrounds the body portion 121 of the frame 120, the inner stator 134 that is disposed between the outer stator 131 and the cylinder 140 and surrounds the cylinder 140, and the mover 135 disposed between the outer stator 131 and the inner stator 134.

The outer stator 131 may be coupled to the rear of the first flange portion 122 of the frame 120, and the inner stator 134 may be coupled to the outer circumferential surface of the body portion 121 of the frame 120. The inner stator 134 may be spaced apart from the inside of the outer stator 131, and the mover 135 may be disposed in a space between the outer stator 131 and the inner stator 134.

The outer stator 131 may be equipped with a winding coil, and the mover 135 may include a permanent magnet. The permanent magnet may be comprised of a single magnet with one pole or configured by combining a plurality of magnets with three poles.

The outer stator 131 may include a coil winding body 132 surrounding the axial direction in the circumferential direction, and a stator core 133 stacked while surrounding the coil winding body 132. The coil winding body 132 may include a hollow cylindrical bobbin 132a and a coil 132b wound in a circumferential direction of the bobbin 132a. A cross section of the coil 132b may be formed in a circular or polygonal shape and, for example, may have a hexagonal shape. In the stator core 133, a plurality of lamination sheets may be laminated radially, or a plurality of lamination blocks may be laminated along the circumferential direction.

The front side of the outer stator 131 may be supported by the first flange portion 122 of the frame 120, and the rear side thereof may be supported by a stator cover 137. For example, the stator cover 137 may be provided in a hollow disc shape, a front surface of the stator cover 137 may be supported by the outer stator 131, and a rear surface thereof may be supported by a resonant spring 118.

The inner stator 134 may be configured by stacking a plurality of laminations on the outer circumferential surface of the body portion 121 of the frame 120 in the circumferential direction.

One side of the mover 135 may be coupled to and supported by the magnet frame 136. The magnet frame 136 has a substantially cylindrical shape and may be disposed to be inserted into a space between the outer stator 131 and the inner stator 134. The magnet frame 136 may be coupled to the rear side of the piston 150 to move together with the piston 150.

As an example, a rear end of the magnet frame 136 is bent and extended inward in the radial direction to form a first coupling portion 136a, and the first coupling portion 136a may be coupled to a third flange portion 153 formed behind the piston 150. The first coupling portion 136a of the magnet frame 136 and the third flange portion 153 of the piston 150 may be coupled through a mechanical coupling member.

A fourth flange portion 161a in front of the intake muffler 161 may be interposed between the third flange portion 153 of the piston 150 and the first coupling portion 136a of the magnet frame 136. Thus, the piston 150, the muffler unit 160, and the mover 135 can linearly reciprocate together in a combined state.

When a current is applied to the drive unit 130, a magnetic flux may be formed in the winding coil, and an electromagnetic force may occur by an interaction between the magnetic flux formed in the winding coil of the outer stator 131 and a magnetic flux formed by the permanent magnet of the mover 135 to move the mover 135. At the same time as the reciprocating movement of the mover 135 in the axial direction, the piston 150 connected to the magnet frame 136 may also reciprocate integrally with the mover 135 in the axial direction.

The drive unit 130 and the compression units 140 and 150 may be supported by the support springs 116 and 117 and the resonant spring 118 in the axial direction.

The resonant spring 118 amplifies the vibration implemented by the reciprocating motion of the mover 135 and the piston 150 and thus can achieve an effective compression of the refrigerant. More specifically, the resonant spring 118 may be adjusted to a frequency corresponding to a natural frequency of the piston 150 and may allow the piston 150 to perform a resonant motion. Further, the resonant spring 118 generates a stable movement of the piston 150 and thus can reduce the generation of vibration and noise.

The resonant spring 118 may be a coil spring extending in the axial direction. Both ends of the resonant spring 118 may be connected to a vibrating body and a fixed body, respectively. For example, one end of the resonant spring 118 may be connected to the magnet frame 136, and the other end may be connected to the back cover 123. Therefore, the resonant spring 118 may be elastically deformed between the vibrating body vibrating at one end and the fixed body fixed to the other end.

A natural frequency of the resonant spring 118 may be designed to match a resonant frequency of the mover 135 and the piston 150 during the operation of the compressor 100, thereby amplifying the reciprocating motion of the piston 150. However, because the back cover 123 provided as the fixing body is elastically supported by the first support spring 116 in the casing 110, the back cover 123 may not be strictly fixed.

The resonant spring 118 may include a first resonant spring 118a supported on the rear side and a second resonant spring 118b supported on the front side based on a spring supporter 119.

The spring supporter 119 may include a body portion 119a surrounding the intake muffler 161, a second coupling portion 119b that is bent from a front of the body portion 119a in the inward radial direction, and a support portion 119c that is bent from the rear of the body portion 119a in the outward radial direction.

A front surface of the second coupling portion 119b of the spring supporter 119 may be supported by the first coupling portion 136a of the magnet frame 136. An inner diameter of the second coupling portion 119b of the spring supporter 119 may cover an outer diameter of the intake muffler 161. For example, the second coupling portion 119b of the spring supporter 119, the first coupling portion 136a of the magnet frame 136, and the third flange portion 153 of the piston 150 may be sequentially disposed and then integrally coupled through a mechanical member. In this instance, the description that the fourth flange portion 161a of the intake muffler 161 can be interposed between the third flange portion 153 of the piston 150 and the first coupling portion 136a of the magnet frame 136, and they can be fixed together is the same as that described above.

The first resonant spring 118a may be disposed between a front surface of the back cover 123 and a rear surface of the spring supporter 119. The second resonant spring 118b may be disposed between a rear surface of the stator cover 137 and a front surface of the spring supporter 119.

A plurality of first and second resonant springs 118a and 118b may be disposed in the circumferential direction of the central axis. The first resonant springs 118a and the second resonant springs 118b may be disposed parallel to each other in the axial direction, or may be alternately disposed. The first and second resonant springs 118a and 118b may be disposed at regular intervals in the radial direction of the central axis. For example, three first resonant springs 118a and three second resonant springs 118b may be provided and may be disposed at intervals of 120 degrees in the radial direction of the central axis.

The compressor 100 may include a plurality of sealing members that can increase a coupling force between the frame 120 and the components around the frame 120.

For example, the plurality of sealing members may include a first sealing member that is interposed at a portion where the frame 120 and the discharge cover assembly 180 are coupled and is inserted into an installation groove provided at the front end of the frame 120, and a second sealing member that is provided at a portion at which the frame 120 and the cylinder 140 are coupled and is inserted into an installation groove provided at an outer surface of the cylinder 140. The second sealing member can prevent the refrigerant of the gas groove 125c between the inner circumferential surface of the frame 120 and the outer circumferential surface of the cylinder 140 from leaking to the outside, and can increase a coupling force between the frame 120 and the cylinder 140. The plurality of sealing members may further include a third sealing member that is provided at a portion at which the frame 120 and the inner stator 134 are coupled and is inserted into an installation groove provided at the outer surface of the frame 120. Here, the first to third sealing members may have a ring shape.

An operation of the linear compressor 100 described above is as follows.

First, when a current is applied to the drive unit 130, a magnetic flux may be formed in the outer stator 131 by the current flowing in the coil 132b. The magnetic flux formed in the outer stator 131 may generate an electromagnetic force, and the mover 135 including the permanent magnet may linearly reciprocate by the generated electromagnetic force. The electromagnetic force may be alternately generated in a direction (forward direction) in which the piston 150 is directed toward a top dead center (TDC) during a compression stroke, and in a direction (rearward direction) in which the piston 150 is directed toward a bottom dead center (BDC) during an intake stroke. That is, the drive unit 130 may generate a thrust which is a force for pushing the mover 135 and the piston 150 in a moving direction.

The piston 150 linearly reciprocating inside the cylinder 140 may repeatedly increase or reduce the volume of the compression space 103.

When the piston 150 moves in a direction (rearward direction) of increasing the volume of the compression space 103, a pressure of the compression space 103 may decrease. Hence, the intake valve 155 mounted in front of the piston 150 is opened, and the refrigerant remaining in the intake space 102 may be sucked into the compression space 103 along the intake port 154. The intake stroke may be performed until the piston 150 is positioned in the bottom dead center by maximally increasing the volume of the compression space 103.

The piston 150 reaching the bottom dead center may perform the compression stroke while switching its motion direction and moving in a direction (forward direction) of reducing the volume of the compression space 103. As the pressure of the compression space 103 increases during the compression stroke, the sucked refrigerant may be compressed. When the pressure of the compression space 103 reaches a setting pressure, the discharge valve 171 is pushed out by the pressure of the compression space 103 and is opened from the cylinder 140, and the refrigerant can be discharged into the discharge space 104 through a separation space. The compression stroke can continue while the piston 150 moves to the top dead center at which the volume of the compression space 103 is minimized.

As the intake stroke and the compression stroke of the piston 150 are repeated, the refrigerant introduced into the accommodation space 101 inside the compressor 100 through the intake pipe 114 may be introduced into the intake space 102 in the piston 150 by sequentially passing the intake guide 116a, the intake muffler 161, and the inner guide 162, and the refrigerant of the intake space 102 may be introduced into the compression space 103 in the cylinder 140 during the intake stroke of the piston 150. After the refrigerant of the compression space 103 is compressed and discharged into the discharge space 104 during the compression stroke of the piston 150, the refrigerant may be discharged to the outside of the compressor 100 via the loop pipe 115a and the discharge pipe 115.

FIGS. 3 and 4 are perspective views of partial configuration of a compressor according to an embodiment of the present disclosure. FIG. 5 is an exploded perspective view of partial configuration of a compressor according to an embodiment of the present disclosure. FIG. 6 is an exploded perspective view of partial configuration of FIG. 5. FIG. 7 is a side view of partial configuration of a compressor according to an embodiment of the present disclosure. FIG. 8 is a cross-sectional view of partial configuration of a compressor according to an embodiment of the present disclosure. FIG. 9 is a plan view of an elastic member according to an embodiment of the present disclosure.

Referring to FIGS. 3 to 9, a compressor 100 according to an embodiment of the present disclosure may include a cylinder 140, a piston 150, an intake valve 155, a rod 200, a coupling member 210, a fixing member 300, an elastic member 400, spacers 500 and 600, and a fastening member 700, but can be implemented except some of these components and does not exclude additional components.

FIGS. 3 to 9 illustrate that the compressor 100 according to an embodiment of the present disclosure can be implemented except the muffler unit 160, by way of example, but the present disclosure is not limited thereto.

The compressor 100 may include the cylinder 140. The cylinder 140 may be fixed to a frame 120. The cylinder 140 may be supported by the frame 120. The cylinder 140 may be disposed in the frame 120. The cylinder 140 may be formed in a cylindrical shape. The cylinder 140 may extend axially. The piston 150 may be disposed in the cylinder 140. The cylinder 140 may form a compression space of a refrigerant.

The compressor 100 may include the piston 150. The piston 150 may be disposed at the cylinder 140. The piston 150 may be disposed inside the cylinder 140. The piston 150 may reciprocate axially in the cylinder 140. The piston 150 may be formed in a cylindrical shape. The rod 200 may be disposed in the piston 150. A body 202 of the rod 200 may be disposed in the piston 150. The rod 200 may be disposed in a central area of the piston 150. More specifically, the piston 150 and the rod 200 may share the same axis. The intake valve 155 may be disposed in front of the piston 150. The fixing member 300 may be disposed outside the piston 150. The elastic member 400 and the spacers 500 and 600 may be disposed at the rear of the piston 150.

The compressor 100 may include the intake valve 155. The intake valve 155 may be disposed at the piston 150. The intake valve 155 may be disposed in front of the piston 150. The intake valve 155 may seal a front opening of the piston 150. The intake valve 155 may selectively open and close an intake port 154. The rod 200 may be coupled to the head portion 151 of the piston 150. One end 204 of the rod 200 may be disposed at the head portion 151 of the piston 150. The one end 204 of the rod 200 may be fixed to the head portion 151 of the piston 150. The one end 204 of the rod 200 may be disposed in a central area of the head portion 151 of the piston 150.

The head portion 151 of the piston 150 may include a rod groove 1552. The rod groove 1552 may be recessed forward from a rear surface of the head portion 151. The rod groove 1552 may be formed in a central area of the rear surface of the intake valve 155. The one end 204 of the rod 200 may be inserted into the rod groove 1552. The one end 204 of the rod 200 may be fixed to the rod groove 1552.

The rod 200 may be disposed at the piston 150. The rod 200 may be disposed inside the piston 150. The rod 200 may extend axially. The rod 200 may be disposed in the central area of the piston 150. A shaft of the rod 200 may be the same as a shaft of the piston 150.

The rod 200 may be fixed to the head portion 151 of the piston 150. More specifically, the one end 204 of the rod 200 may be fixed to the head portion 151 of the piston 150. For example, the one end 204 of the rod 200 may be disposed in the rod groove 1552 of the head portion 151 of the piston 150.

The rod 200 may be connected to the elastic member 400. More specifically, other end 209 of the rod 200 may be connected to the elastic member 400 through the coupling member 210. The rod 200 may be formed in a long rod shape. The rod 200 may be formed of a material with elasticity. The rod 200 may distribute a lateral force generated when the piston 150 reciprocates axially. Hence, the present disclosure can prevent damage to the piston 150 and improve lifespan of the product.

The rod 200 may include the body 202. The body 202 may form an appearance of the rod 200. The body 202 may be formed in a rod shape extending axially. A cross-section of the body 202 may be formed in a circle or oval shape. The body 202 may be disposed inside the piston 150. The body 202 may be disposed in the central area of the piston 150. A shaft of the body 202 may be the same as the shaft of the piston 150. The body 202 may be formed of a material with elasticity.

The rod 200 may include a first guide portion 206. The first guide portion 206 may extend radially from the body 202 of the rod 200. The first guide portion 206 may be formed between the front end 204 and the central area of the body 202 of the rod 200. The first guide portion 206 may guide the one end 204 of the rod 200 inserted into the rod groove 1552. A front part of the first guide portion 206 may be formed in a shape corresponding to a rear part of the rod groove 1552. The front part of the first guide portion 206 may be disposed at the rear part of the rod groove 1552.

The rod 200 may include a second guide portion 208. The second guide portion 208 may extend radially from the body 202 of the rod 200. The second guide portion 208 may be formed between the other end 209 and the central area of the body 202 of the rod 200. The second guide portion 208 may guide the other end 209 of the rod 200 to be coupled to the coupling member 210. A rear part of the second guide portion 208 may be formed in a shape corresponding to a front part of the coupling member 210. The rear part of the second guide portion 208 may be disposed at the front part of the coupling member 210.

The compressor 100 may include the coupling member 210. The coupling member 210 may be disposed in a rear area of the piston 150. At least a part of the coupling member 210 may be disposed inside the piston 150. The coupling member 210 may pass through the elastic member 400 and the inner spacer 600. A rear part 212 of the coupling member 210 may pass through the elastic member 400 and the inner spacer 600 and may be coupled to a first fastening member 710.

The coupling member 210 may be coupled to the rod 200. The other end 209 of the rod 200 may be coupled to a front part 211 of the coupling member 210. One side of the coupling member 210 may be formed in a shape corresponding to other end of the rod 200. The front part 211 of the coupling member 210 may include a groove into which the other end 209 of the rod 200 is inserted. The groove of the coupling member 210 into which the other end 209 of the rod 200 is inserted may be formed in a central area of the front part 211 of the coupling member 210.

A radius of the coupling member 210 may be formed to be larger than a radius of the rod 200. The radius of the coupling member 210 may be formed to be larger than a radius of a central area of the rod 200. More specifically, a radius of the rear part 212 of the coupling member 210 may be formed to be larger than a radius of the body 202 of the rod 200. Through this, coupling stability between the elastic member 400 and the inner spacer 600 can be improved.

An embodiment of the present disclosure describes that the rod 200 and the coupling member 210 are separately formed and coupled to each other, by way of example. However, the rod 200 and the coupling member 210 may be integrally formed, and the other end 209 of the rod 200 may pass through an inner hole 203 of an inner portion 402 of the elastic member 400 and may be directly coupled to the first fastening member 710 without the coupling member 210.

The compressor 100 may include the fixing member 300. The fixing member 300 may be disposed outside the piston 150. At least a portion of the fixing member 300 may radially overlap the piston 150. The fixing member 300 may be formed in a circular band shape. The elastic member 400 may be coupled to the fixing member 300. An outer portion 404 of the elastic member 400 may be coupled to the fixing member 300. Specifically, the outer portion 404 of the elastic member 400 may be coupled to the fixing member 300 through a second fastening member 720. The spacers 500 and 600 may be coupled to the fixing member 300. The outer spacer 500 may be coupled to the fixing member 300. Specifically, the outer spacer 500 may be coupled to the fixing member 300 through the second fastening member 720. In this case, the second fastening member 720 may be coupled to a fastening hole 312 of the fixing member 300. For example, the second fastening member 720 may be screw-coupled to the fastening hole 312 of the fixing member 300, but is not limited thereto. The number of fastening holes 312 of the fixing member 300 may be variously changed depending on the number of the second fastening members 720.

The fixing member 300 may include an extension 310. The extension 310 may protrude forward from the fixing member 300. The extension 310 may radially overlap the piston 150. The extension 310 may radially overlap the other end 209 of the rod 200. The extension 310 may radially overlap the front part 211 of the coupling member 210. The extension 310 may axially overlap an outer hole 405 of the outer portion 404 of the elastic member 400. The extension 310 may axially overlap a second hole 504 of the outer spacer 500. The extension 310 may include the fastening hole 312 to which the second fastening member 720 is coupled. Since the length in the axial direction to which the second fastening member 720 is coupled can be extended through the extension 310, coupling stability by the second fastening member 720 can be improved.

The compressor 100 may include the elastic member 400. The elastic member 400 may be disposed at the rear of the piston 150. The elastic member 400 may be disposed at the rear of the rod 200. The elastic member 400 may radially overlap the coupling member 210. The elastic member 400 may radially overlap the outer spacer 500. The elastic member 400 may be connected to the fixing member 300 together with the outer spacer 500 through the second fastening member 720.

The elastic member 400 may radially overlap the inner spacer 600. The elastic member 400 may be coupled to the inner spacer 600. The elastic member 400 may be connected to the other end 209 of the rod 200 through the inner spacer 600 and the coupling member 210. The elastic member 400 may have structural elasticity. Alternatively, the elastic member 400 may be formed of a material with elasticity. The elastic member 400 may include a leaf spring. Through this, the elastic member 400 may elastically support the rod 200 and/or the piston 150.

The elastic member 400 may include the inner portion 402. The inner portion 402 may radially overlap the piston 150. The inner portion 402 may be connected to the rod 200. The inner portion 402 may be coupled to the inner spacer 600. The inner portion 402 may be coupled to the coupling member 210. The inner portion 402 may be penetrated by the rear part 212 of the coupling member 210. The inner portion 402 may be connected to the other end 209 of the rod 200 through the coupling member 210. An inner hole 403 may be formed in the inner portion 402. The inner hole 403 may be formed in a central area of the inner portion 402.

The elastic member 400 may include the inner hole 403. The inner hole 403 may be formed in the inner portion 402. The inner hole 403 may be formed in the central area of the inner portion 402. The inner hole 403 may axially overlap a first hole 604 of the inner spacer 600. The inner hole 403 may axially overlap the piston 150. The inner hole 403 may axially overlap the rod 200. The inner hole 403 may be coupled to the coupling member 210. A radius of the inner hole 403 may have a size corresponding to the radius of the rear part 212 of the coupling member 210. The inner hole 403 may be penetrated by the rear part 212 of the coupling member 210.

The elastic member 400 may include the outer portion 404. The outer portion 404 may be disposed outside the inner portion 402. The outer portion 404 may be spaced apart from the inner portion 402. The outer portion 404 may not axially overlap the piston 150. The outer portion 404 may be connected to the fixing member 300. The outer portion 404 may be coupled to the outer spacer 500. The outer portion 404 may be connected to the fixing member 300 through the second fastening member 720.

The elastic member 400 may include the outer hole 405. The outer hole 405 may be formed in the outer portion 404. The outer hole 405 may be connected to the fixing member 300. The outer hole 405 may axially overlap the second hole 504 of the outer spacer 500. The outer hole 405 may be penetrated by the second fastening member 720. The outer hole 405 may include a plurality of outer holes that is radially disposed around the center of the elastic member 400. An embodiment of the present disclosure describes that the three outer holes 405 are formed in the outer portion 404, by way of example, but is not limited thereto. For example, the number of outer holes 405 can be variously changed.

The elastic member 400 may include a connection portion 406. The connection portion 406 may connect the inner portion 402 and the outer portion 404. The connection portion 406 may be disposed between the inner portion 402 and the outer portion 404. The connection portion 406 may be formed in a spiral shape. The connection portion 406 may include a plurality of connection members formed in a spiral shape. The plurality of connection members may be spaced apart from each other. The plurality of connection members may have shapes corresponding to each other. A separation space 407 may be formed in a space between the plurality of connection members. Through this, the elastic member 400 can have structural elasticity.

The elastic member 400 may be axially spaced apart from the piston 150. A rear surface of the piston 150 and a front surface of the elastic member 400 may be axially spaced apart from each other. For example, a first elastic member 410 and the rear surface of the piston 150 may be axially spaced apart from each other. Through this, the refrigerant at the rear of the piston 150 may be introduced into the piston 150 via the separation space 407 between the plurality of connection members and the space between the rear surface of the piston 150 and the elastic member 400.

The elastic member 400 may include the first elastic member 410. The first elastic member 410 may be disposed at the rear of the piston 150. The first elastic member 410 may be disposed at the rear of the rod 200. The first elastic member 410 may be disposed at the rear of the fixing member 300. The first elastic member 410 may be disposed in front of a second elastic member 420. The first elastic member 410 may be axially spaced apart from the second elastic member 420. The first elastic member 410 may be formed in a shape corresponding to a shape of the second elastic member 420. The first elastic member 410 may be connected to the rod 200 through the coupling member 210. The first elastic member 410 may be connected to the fixing member 300 through the second fastening member 720.

The elastic member 400 may include the second elastic member 420. The second elastic member 420 may be disposed at the rear of the first elastic member 410. The second elastic member 420 may be disposed in front of a third elastic member 430. The second elastic member 420 may be axially spaced apart from the third elastic member 430. The second elastic member 420 may be formed in a shape corresponding to a shape of the third elastic member 430. The second elastic member 420 may be connected to the rod 200 through the coupling member 210. The second elastic member 420 may be connected to the fixing member 300 through the second fastening member 720.

The elastic member 400 may include the third elastic member 430. The third elastic member 430 may be disposed at the rear of the second elastic member 420. The third elastic member 430 may be axially spaced apart from the second elastic member 420. The third elastic member 430 may be connected to the rod 200 through the coupling member 210. The third elastic member 430 may be connected to the fixing member 300 through the second fastening member 720.

An embodiment of the present disclosure describes that the first to third elastic members 410, 420, and 430 have the same shape, by way of example. However, at least one of the first elastic member 410, the second elastic member 420, and the third elastic member 430 may have a different shape from the other elastic member.

An embodiment of the present disclosure describes that the number of elastic members 400 is three, by way of example. However, an embodiment of the present disclosure describes is not limited thereto and can be variously changed as long as the number of elastic members 400 is two or more.

The compressor 100 may include the spacers 500 and 600. The spacers 500 and 600 may be disposed between the first elastic member 410 and the second elastic member 420. The spacers 500 and 600 may be disposed between the second elastic member 420 and the third elastic member 430. The spacers 500 and 600 may separate the first elastic member 410 from the second elastic member 420 and separate the second elastic member 420 from the third elastic member 430. Through this, each of the plurality of elastic members 410, 420, and 430 can elastically support the piston 150 and/or the rod 200.

The spacers 500 and 600 may be insert-injected with the elastic member 400. The spacers 500 and 600 may be insert-injected with the first elastic member 410, the second elastic member 420, and the third elastic member 430. Through this, the cost of the product can be reduced by reducing the number of components, and it is easy to manage and transport through modularization. The spacers 500 and 600 may be formed of a plastic material. Through this, the reliability of the product can be improved by removing the metal product between the elastic members 400.

The spacers 500 and 600 may include the outer spacer 500. The outer spacer 500 may be insert-injected with an outer portion of the first elastic member 410, an outer portion of the second elastic member 420, and an outer portion of the third elastic member 430. The outer spacer 500 may cover a front surface, an outer surface, and a rear surface of the outer portion of the first elastic member 410, a front surface, an outer surface, and a rear surface of the outer portion of the second elastic member 420, and an outer surface, a front surface, and a rear surface of the outer portion of the third elastic member 430.

The outer spacer 500 may be formed in a cylindrical shape in which an opening is formed in the center. The outer spacer 500 may include an elastic groove 502 in which the outer surface of the outer portion of the first elastic member 410, the outer surface of the outer portion of the second elastic member 420, and the outer surface of the outer portion of the third elastic member 430 are disposed. The elastic groove 502 may be formed in an inner surface of the outer spacer 500.

The outer spacer 500 may include the second hole 504. The second hole 504 may extend axially. The second hole 504 may axially overlap an outer hole of the outer portion of the first elastic member 410, an outer hole of the outer portion of the second elastic member 420, and an outer hole of the outer portion of the third elastic member 430. The second hole 504 may be penetrated by the second fastening member 720. The second hole 504 may include a plurality of second holes that are spaced apart from each other. An embodiment of the present disclosure describes that the plurality of second holes are three, by way of example. However, the number of second holes can be variously changed based on the number of outer hole of the outer portion of the first elastic member 410, outer hole of the outer portion of the second elastic member 420, and outer hole of the outer portion of the third elastic member 430.

The spacers 500 and 600 may include the inner spacer 600. The inner spacer 600 may be disposed inside the outer spacer 500. The inner spacer 600 may be spaced apart from the outer spacer 500. The inner spacer 600 may be insert-injected with an inner portion of the first elastic member 410, an inner portion of the second elastic member 420, and an inner portion of the third elastic member 430. The inner spacer 600 may cover a front surface, an outer surface, and a rear surface of the inner portion of the first elastic member 410, a front surface, an outer surface, and a rear surface of the inner portion of the second elastic member 420, and a front surface, an outer surface, and a rear surface of the inner portion of the third elastic member 430.

The inner spacer 600 may include the first hole 604. The first hole 604 may be formed in a central area of the inner spacer 600. The first hole 604 may extend axially. The first hole 604 may axially overlap an inner hole of the inner portion of the first elastic member 410, an inner hole of the inner portion of the second elastic member 420, and an inner hole of the inner portion of the third elastic member 430. The first hole 604 may axially overlap the rod 200. The first hole 604 may be penetrated by the coupling member 210. The rear part 212 of the coupling member 210 may be disposed in the first hole 604. A radius of the first hole 604 may have a size corresponding to the radius of the rear part 212 of the coupling member 210.

The compressor 100 may include the fastening member 700. The fastening member 700 may include the first fastening member 710. The first fastening member 710 may be disposed at the rear of the inner spacer 600. The first fastening member 710 may be coupled to the coupling member 210. The first fastening member 710 may be coupled to the rear part 212 of the coupling member 210 passing through the inner hole 403 of the inner portion 402 of the elastic member 400 and the first hole 604 of the inner spacer 600. For example, the first fastening member 710 may be screw-coupled to the rear part 212 of the coupling member 210 passing through the inner portion 402 of the elastic member 400 and the first hole 604 of the inner spacer 600. The first fastening member 710 may fix the other end of the rear part 212 of the coupling member 210 to a rear surface of the inner spacer 600. Through this, the first fastening member 710 can couple the coupling member 210, the inner portion 402 of the elastic member 400, and the inner spacer 600.

The fastening member 700 may include the second fastening member 720. The second fastening member 720 may pass through the outer hole 405 of the outer portion 404 of the elastic member 400 and the second hole 504 of the outer spacer 500 and may be coupled to the fastening hole 312 of the fixing member 300. For example, the second fastening member 720 may pass through the outer hole 405 of the outer portion 404 of the elastic member 400 and the second hole 504 of the outer spacer 500 and may be screw-coupled to the fastening hole 312 of the fixing member 300. Through this, the second fastening member 720 can couple the outer portion 404 of the elastic member 400 and the outer spacer 500 to the fixing member 300. The second fastening member 720 may include a plurality of second fastening members that is radially disposed around the central area of the elastic member 400. An embodiment of the present disclosure describes that the plurality of second fastening members are three, by way of example. However, the number of second fastening members is not limited thereto and can be variously changed.

FIGS. 10 and 11 are perspective views of an elastic member and a spacer according to another embodiment of the present disclosure.

With reference to FIGS. 10 and 11, another embodiment of the present disclosure is described below.

In another embodiment of the present disclosure, the inner spacer 600 may be changed to second spacers 610 and 620. The second spacers 610 and 620 may be disposed on a front surface and a rear surface of an inner portion 402 of an elastic member 400. The second spacers 610 and 620 may be coupled to the front surface and the rear surface of the inner portion 402 of the elastic member 400 using an adhesive, etc. The second spacers 610 and 620 may be disposed adjacent to an inner hole 404 of the inner portion 402 of the elastic member 400. The second spacers 610 and 620 may be formed in a circular band shape. The second spacers 610 and 620 may be formed in a ring shape. The second spacers 610 and 620 may be formed of a plastic material.

FIGS. 12 and 13 are perspective views of an elastic member and a spacer according to yet another embodiment of the present disclosure.

With reference to FIGS. 12 and 13, yet another embodiment of the present disclosure is described below.

In yet another embodiment of the present disclosure, the inner spacer 600 may be changed to second spacers 610 and 620. The second spacers 610 and 620 may be disposed on a front surface and a rear surface of an inner portion 402 of an elastic member 400. The second spacers 610 and 620 may be coupled to the front surface and the rear surface of the inner portion 402 of the elastic member 400 using an adhesive, etc. The second spacers 610 and 620 may be disposed adjacent to an inner hole 403 of the inner portion 402 of the elastic member 400. The second spacers 610 and 620 may be formed in a circular band shape. The second spacers 610 and 620 may be formed in a ring shape. The second spacers 610 and 620 may be formed of a plastic material.

In yet another embodiment of the present disclosure, the outer spacer 500 may be changed to third spacers 510 and 520. The third spacers 510 and 520 may be disposed on a front surface and a rear surface of an outer portion 404 of the elastic member 400. The third spacers 510 and 520 may be coupled to the front surface and the rear surface of the outer portion 404 of the elastic member 400 using an adhesive, etc. The third spacers 510 and 520 may be disposed adjacent to an outer hole 405 of the outer portion 404 of the elastic member 400. The third spacers 510 and 520 may be formed in a circular band shape. The third spacers 510 and 520 may be formed in a ring shape. The third spacers 510 and 520 may be formed of a plastic material.

FIG. 14 is a perspective view of an elastic member and a spacer according to still yet another embodiment of the present disclosure.

With reference to FIG. 14, still yet another embodiment of the present disclosure is described below.

In still yet another embodiment of the present disclosure, the inner spacer 600 may be changed to a second spacer 610. The second spacer 610 may be disposed on one surface of an inner portion 402 of an elastic member 400. The second spacer 610 may be coupled to one surface of the inner portion 402 of the elastic member 400 using an adhesive, etc. Specifically, the second spacer 610 may be coupled to one surface of a third elastic member 430 and disposed between a second elastic member 420 and the third elastic member 430, and may be coupled to one surface of the second elastic member 420 and disposed between a first elastic member 410 and the second elastic member 420. The second spacer 610 may be disposed adjacent to an inner hole 404 of the inner portion 402 of the elastic member 400. The second spacer 610 may be formed in a circular band shape. The second spacer 610 may be formed in a ring shape. The second spacer 610 may be formed of a plastic material.

In still yet another embodiment of the present disclosure, the outer spacer 500 may be changed to a third spacer 510. The third spacer 510 may be disposed on one surface of an outer portion 404 of the elastic member 400. The third spacer 510 may be coupled to one surface of the outer portion 404 of the elastic member 400 using an adhesive, etc. Specifically, the third spacer 510 may be coupled to one surface of the third elastic member 430 and disposed between the second elastic member 420 and the third elastic member 430, and may be coupled to one surface of the second elastic member 420 and disposed between the first elastic member 410 and the second elastic member 420. The third spacer 510 may be disposed adjacent to an outer hole 405 of the outer portion 404 of the elastic member 400. The third spacer 510 may be formed in a circular band shape. The third spacer 510 may be formed in a ring shape. The third spacer 510 may be formed of a plastic material.

Some embodiments or other embodiments of the present disclosure described above are not exclusive or distinct from each other. Some embodiments or other embodiments of the present disclosure described above can be used together or combined in configuration or function.

For example, configuration "A" described in an embodiment and/or the drawings and configuration "B" described in another embodiment and/or the drawings can be combined with each other. That is, even if the combination between the configurations is not directly described, the combination is possible except in cases where it is described that it is impossible to combine.

The above detailed description is merely an example and is not to be considered as limiting the present disclosure. The scope of the present disclosure should be determined by rational interpretation of the appended claims, and all variations within the equivalent scope of the present disclosure are included in the scope of the present disclosure.

The invention claimed is:

1. A compressor comprising:
a cylinder that extends in an axial direction and defines a compression space configured to receive refrigerant;
a piston configured to reciprocate in the cylinder along the axial direction, the piston comprising (i) a guide portion that has a cylindrical shape and defines a rear side of the piston and (ii) a head portion that is disposed at the guide portion and defines a front side of the piston;
an intake valve disposed at the head portion and configured to supply the refrigerant to the compression space;
a rod that extends rearward from the head portion in the axial direction, the rod having a first side that is disposed at the head portion and a second side that is disposed opposite to the first side of the rod;
a fixing member disposed radially outside the piston;
a first elastic member connected to the fixing member and to the second side of the rod;
a second elastic member spaced apart from the first elastic member and disposed rearward relative to the first elastic member in the axial direction, the second elastic member being connected to the fixing member and to the second side of the rod; and
a first spacer disposed at the second side of the rod, the first spacer being insert-injected with the first elastic member and the second elastic member.

2. The compressor of claim 1, wherein the first elastic member comprises:
a first inner portion connected to the second side of the rod,
a first outer portion connected to the fixing member, and
a first connection portion that connects the first inner portion to the first outer portion, and
wherein the second elastic member comprises:
a second inner portion that faces the first inner portion in the axial direction,
a second outer portion that faces the first outer portion in the axial direction, and
a second connection portion that connects the second inner portion to the second outer portion.

3. The compressor of claim 2, wherein the first spacer comprises an inner spacer that is insert-injected with the first inner portion and the second inner portion, and
wherein the inner spacer covers each of a front surface of the first inner portion, an outer circumferential surface of the first inner portion, a rear surface of the first inner portion, a front surface of the second inner portion, an outer circumferential surface of the second inner portion, and a rear surface of the second inner portion.

4. The compressor of claim 3, wherein the inner spacer defines a first hole at a central area thereof,
wherein the first inner portion has a first inner hole defined at a central area of the first inner portion facing the central area of the inner spacer such that the first inner hole overlaps with the first hole along the axial direction,
wherein the second inner portion has a second inner hole defined at a central area of the second inner portion facing the central area of the inner spacer such that the second inner hole overlaps with the first hole along the axial direction, and
wherein an axis of the rod extends from the second side of the rod in the axial direction through the first hole, the first inner hole, and the second inner hole along the axial direction.

5. The compressor of claim 4, further comprising:
a coupling member coupled to an end of the rod disposed at the second side of the rod,
wherein the coupling member passes through the first hole, the first inner hole, and the second inner hole.

6. The compressor of claim 5, further comprising:
a first fastening member that fixes an end of the coupling member to a rear surface of the inner spacer.

7. The compressor of claim 5, wherein a radius of the coupling member is greater than a radius of a central part of the rod that is disposed between the first side and the second side of the rod, and
wherein a shape of an end of the coupling member corresponds to a shape of the end of the rod.

8. The compressor of claim 2, wherein the first spacer comprises an outer spacer that is insert-injected with the first outer portion and the second outer portion, and
wherein the outer spacer covers each of a front surface of the first outer portion, an outer circumferential surface of the first outer portion, a rear surface of the first outer portion, a front surface of the second outer portion, an outer circumferential surface of the second outer portion, and a rear surface of the second outer portion.

9. The compressor of claim 8, further comprising:
a second fastening member that couples the outer spacer, the first outer portion, and the second outer portion to the fixing member.

10. The compressor of claim 9, wherein the outer spacer defines a second hole that faces the fixing member in the axial direction,
wherein the first outer portion defines a first outer hole facing the second hole such that the first outer hole overlaps with the second hole along the axial direction,
wherein the second outer portion defines a second outer hole facing the second hole such that the second outer hole overlaps with the second hole along the axial direction,
wherein the fixing member defines a fastening hole facing the second hole such that the fastening hole overlaps with the second hole along the axial direction, and
wherein the second fastening member passes through the second hole, the first outer hole, the second outer hole, and the fastening hole.

11. The compressor of claim 10, wherein the fixing member comprises an extension that is disposed at a position corresponding to the second hole and extends forward toward the front side of the piston.

12. The compressor of claim 2, wherein the first connection portion comprises a plurality of first connection members that have a first spiral shape and are spaced apart from one another, and
wherein the second connection portion comprises a plurality of second connection members that have a second spiral shape and are spaced apart from one another.

13. The compressor of claim 12, wherein the first elastic member is spaced apart from a rear surface of the piston to thereby define a rear space between the rear surface of the piston and the first elastic member,
wherein the first connection portion defines a first spiral space between the plurality of first connection members,
wherein the second connection portion defines a second spiral space between the plurality of second connection members, and
wherein the piston is configured to receive the refrigerant introduced to the rear side of the piston through the first spiral space, the second spiral space, and the rear space defined between the rear surface of the piston and the first elastic member.

14. The compressor of claim 2, further comprising:
a second spacer disposed between a rear surface of the first inner portion and a front surface of the second inner portion,
wherein the first spacer comprises an outer spacer that is insert-injected with the first outer portion and the second outer portion.

15. The compressor of claim 1, wherein the intake valve defines a rod groove at a central area of the head portion, the rod groove receiving an end of the rod disposed at the first side of the rod.

16. The compressor of claim 1, wherein each of the first elastic member and the second elastic member comprises a leaf spring.

17. A compressor comprising:
a cylinder that extends in an axial direction and defines a compression space configured to receive refrigerant;
a piston configured to reciprocate in the cylinder along the axial direction, the piston comprising (i) a guide portion that has a cylindrical shape and defines a rear side of the piston and (ii) a head portion that is disposed at the guide portion and defines a front side of the piston;
an intake valve disposed at the head portion and configured to supply the refrigerant to the compression space;
a rod that extends rearward from the head portion in the axial direction, the rod having a first side disposed at the head portion and a second side that is disposed opposite to the first side;
a fixing member disposed radially outside the piston;
a first elastic member connected to the fixing member and to the second side of the rod;
a second elastic member spaced apart from the first elastic member and disposed rearward relative to the first elastic member in the axial direction, the second elastic member being connected to the fixing member and to the second side of the rod; and
a spacer disposed between the first elastic member and the second elastic member.

18. The compressor of claim 17, wherein the first elastic member comprises:
a first inner portion connected to an end of the rod disposed at the second side of the rod;
a first outer portion connected to the fixing member; and
a first connection portion that connects the first inner portion to the first outer portion, and
wherein the second elastic member comprises:
a second inner portion that faces the first inner portion in the axial direction,
a second outer portion that faces the first outer portion in the axial direction, and
a second connection portion that connects the second inner portion to the second outer portion.

19. The compressor of claim 18, wherein the first inner portion defines a first inner hole at a central area of the first inner portion,
wherein the second inner portion has a second inner hole defined at a central area of the second inner portion such that the second inner hole overlaps with the first inner hole along the axial direction,
wherein an axis of the rod extends from the second side of the rod in the axial direction through the first inner hole and the second inner hole, and wherein the spacer is disposed between the first inner portion and the second inner portion, the spacer being disposed adjacent to the first inner hole or the second inner hole.

20. The compressor of claim 18, wherein the first outer portion defines a first outer hole, wherein the second outer portion defines a second outer hole facing the first outer hole such that the second outer hole overlaps with the first outer hole along the axial direction, and wherein the spacer is disposed between the first outer portion and the second outer portion, the spacer being disposed adjacent to the first outer hole or the second outer hole.

* * * * *